United States Patent [19]

Paranjpe

[11] Patent Number: 5,634,237

[45] Date of Patent: Jun. 3, 1997

[54] SELF-GUIDED, SELF-PROPELLED, CONVERTIBLE CLEANING APPARATUS

[76] Inventor: Ajit P. Paranjpe, 3205 Roundrock Trail, Plano, Tex. 75075

[21] Appl. No.: 412,890

[22] Filed: Mar. 29, 1995

[51] Int. Cl.$^6$ ................................................ A47L 9/28
[52] U.S. Cl. ........................ 15/319; 15/323; 15/340.1
[58] Field of Search .......................... 15/319, 340.1

[56] References Cited

U.S. PATENT DOCUMENTS

| | | | |
|---|---|---|---|
| 4,503,581 | 3/1985 | Early | 15/340.1 X |
| 4,700,427 | 10/1987 | Knepper | 15/340.1 X |
| 4,967,862 | 11/1990 | Pong et al. | 15/319 X |
| 5,032,775 | 7/1991 | Mizuno et al. | 15/319 X |
| 5,086,535 | 2/1992 | Grossmeyer et al. | 15/319 |
| 5,095,577 | 3/1992 | Jonas et al. | 15/340.1 X |
| 5,109,566 | 5/1992 | Kobayashi et al. | 15/340.1 X |
| 5,293,955 | 3/1994 | Lee | 15/319 X |
| 5,341,540 | 8/1994 | Soupert et al. | 15/319 |

*Primary Examiner*—Chris K. Moore

[57] ABSTRACT

A self-guided, self-propelled, convertible cleaning apparatus powered by a flexible electrical power cable connected to a conventional electrical power socket is described. In the self-guided mode, the cleaning apparatus automatically traverses the entire area to be cleaned, avoids obstacles located within the area being cleaned, prevents looping of the flexible electrical power cable around these obstacles, and returns to its starting position, without any pre-defined knowledge of the size and shape of the area being cleaned, and the size and position of obstacles within the area being cleaned. In the manual mode an operator guides the motion of the cleaning apparatus over the area to be cleaned using a detachable handle. This path is memorized by the cleaning apparatus and may be used subsequently for self-guided cleaning operation. In the manual mode the operator can also clean narrow spaces and crevices by attaching a flexible suction hose to the cleaning apparatus.

16 Claims, 22 Drawing Sheets

Case 1　　　　Case 2　　　　Case 3

SELF-GUIDED, SELF-PROPELLED, CONVERTIBLE CLEANING APPARATUS

BACKGROUND OF THE INVENTION

1. Field of the Invention

This invention relates in general to surface cleaning devices and in particular to a self-propelled surface cleaning apparatus that is self-guided so that it automatically traverses the area to be cleaned without any operator intervention, draws electrical power from a conventional electrical power socket via a flexible electrical power cable, and is convertible so that it can also be operated manually in the conventional manner.

2. Description of Related Art

Various surface cleaning devices have been developed and are in use for household and commercial applications. There is a need to automate operation of these devices to reduce the burden on the operator and also in cases where surfaces that have to be cleaned contain materials that are hazardous. Several embodiments of self-propelled automatic cleaning devices have been disclosed in the patent literature. A typical automatic cleaning apparatus comprises suction nozzles and/or brushes for cleaning the surface traversed by the cleaning apparatus, a drive system for propelling the cleaning apparatus over the area to be cleaned, a controller to direct the motion of the cleaning apparatus over the area to be cleaned, and associated sensors that detect the presence of obstacles, the condition of the surface to be cleaned, and the distance traversed by the cleaning apparatus. However, these embodiments have not been widely commercialized, because of several limitations that make them impractical and expensive to implement.

U.S. Pat. No. 3,789,939 issued to Geislinger, U.S. Pat. No. 4,700,427 issued to Knepper and U.S. Pat. No. 5,341,540 issued to Soupert et al disclose methods for self-guided movement of a cleaning apparatus in which the area to be cleaned is first manually traversed with the cleaning apparatus, and the path of motion is stored in the memory of the cleaning apparatus. During subsequent operation the cleaning apparatus uses the path stored in memory to traverse the area to be cleaned. This approach is not feasible for cleaning of areas that are in use since any rearrangement of the obstacles within the area to be cleaned, or a change in the starting position of the cleaning apparatus requires re-programming. Re-programming is tedious and detracts from the self-guiding feature of the cleaning apparatus.

Radio control methods for controlling the motion of the cleaning apparatus described in U.S. Pat. No. 4,369,543 issued to Chen et al and U.S. Pat. No. 4,513,469 issued to Godfrey et al are not truly self-guided methods since they require an operator to guide the motion of the cleaning apparatus albeit remotely. Another approach for self-guided movement uses guides as proposed in U.S. Pat. No. 5,095,577 issued to Jonas et at. For this method to be viable guides have to be installed in the area to be cleaned. Installation of guides is inconvenient for normal household and commercial applications. Also it may be necessary to clean a multitude of rooms, all of which may not be equipped with guides. Betker et al in U.S. Pat. No. 5,279,672 have proposed the use of coded reflective targets to provide information to the cleaning apparatus for positioning it along desired cleaning paths. While this mitigates the inconvenience and expense associated with the installation of guides, coded reflective targets have to be installed instead. In U.S. Pat. No. 5,293,955 to Lee guides are installed on the body of the cleaning apparatus. Similarly in U.S. Pat. No. 5,309,592 to Hiratsuka a sliding contact force sensor is used to maintain a safe distance from obstacles. Both these approaches do not work well with odd shaped obstacles that might be encountered during the cleaning operation.

U.S. Pat. No. 5,109,566 issued to Kobayashi et al proposes a method for self-guided motion of the cleaning apparatus that mitigates most of the limitations discussed earlier. The area to be cleaned is divided into a series of blocks, and an algorithm is used to automatically traverse the blocks. The algorithms used to traverse the room described in U.S. Pat. No. 5,109,566 have been further refined in U.S. Pat. No. 5,284,522 also issued to Kobayashi et al so that an arbitrarily shaped room with a random arrangement of obstacles within it can be automatically traversed by the cleaning apparatus. However, at the end of the cleaning operation, or in the case of obstacles that are U-shaped the cleaning apparatus must move from one position to the next that are physically disjoint. An automated procedure for accomplishing this motion has not been described, and thus presumably the cleaning apparatus relies on the aid of an operator to move the cleaning apparatus to its next position. Besides this shortcoming in the self-guiding procedure, the cleaning apparatus described is still impractical for normal home and commercial use due to other limitations of the prior art that have not been rectified. The electrical power source for the self-guided cleaning apparatus is an on-board battery and charger system. U.S. Pat. No. 4,173,809 to Ku also proposes an on-board battery for powering an automatic vacuum cleaner. Typical electrical power consumption of the electric motors that propel the cleaning apparatus and power the cleaning apparatus suction fan range from 1 kW–2 kW. Batteries that can supply these high electrical power levels are bulky, expensive, and require frequent charging. Charging is usually slow and typically requires 1–3 hours. This increases the time required for the apparatus to clean a large sized room since frequent charging is necessary. Thus using an on-board battery as the primary electrical power source is impractical for cleaning apparatus.

The self-guided cleaning apparatus described in U.S. Pat. No. 5,284,522 to Kobayashi et al also uses an elaborate combination of sensors for detecting obstacles (e.g. ultrasonic and touch sensitive proximity sensors), sensing distance traveled (e.g. rotary encoders), orientation of the cleaning apparatus (e.g. gyroscopes), and sensing the condition of the surface being cleaned. These sensors contribute significantly to the cost and complexity of the apparatus. Ultrasonic and touch sensitive sensors are not effective in detecting odd shaped obstacles. Often, dust particles and debris accumulate near the edges of obstacles, and it is necessary for the cleaning apparatus to contact the obstacle for effective cleaning. Ultrasonic sensors are not suited for detecting contact with odd shaped obstacles. Also, many of these sensors are critical for the self-guided operation since the cleaning apparatus has to return accurately to its home position for charging of its on-board battery.

Further, the self-guided cleaning apparatus requires steering mechanisms to enable movement of the cleaning apparatus in two mutually orthogonal directions. Steering mechanisms are complex, and require special sensors to detect the orientation of the apparatus. Detecting the position of the apparatus relative to the starting position is complicated and error-prone without the aid of a gyroscope. Steering is impossible if the turning radius of the cleaning apparatus is larger than the area being cleaned. This condition may arise while cleaning narrow confined spaces. A sharp ninety degree turn in moving direction, which is the basis of the algorithms disclosed, is not possible unless the turning radius of the cleaning apparatus is zero. A zero turning radius cannot be achieved with conventional steering mechanisms.

Thus while U.S. Pat. Nos. 5,109,566 and 5,284,522 teach methods that are substantial improvements over the prior art, further refinements are necessary to make a self-guided cleaning apparatus truly practical for normal home and commercial applications. The object of the present invention is to obviate the need for on-board battery power sources, elaborate steering mechanisms, and expensive sensors while providing a truly self-guided cleaning apparatus. The principal elements of this invention are the subject matter of US Document Disclosure No. 347,798 and are presented in this application.

SUMMARY OF THE INVENTION

The object of the present invention is to provide a self-guided, self-propelled cleaning apparatus which starts from any arbitrary point located within the area to be cleaned, automatically cleans all regions of the arbitrarily shaped area, avoids all obstacles located within the area, and automatically returns to the starting position upon completion of cleaning. The cleaning apparatus draws electrical power from an external power source such as a conventional wall or floor electrical socket via a flexible electrical power cable obviating the need for a high power compatible on-board battery and charger system. The cleaning path is automatically adjusted so that the electrical power cable does not loop around obstacles during the motion of the cleaning apparatus. A detachable handle allows the cleaning apparatus to be used manually in the conventional manner by an operator. During manual cleaning the cleaning path may be stored in memory and this may be used subsequently for automated cleaning along the pre-programmed path. A conventional flexible suction hose may also be used during manual operation for cleaning of narrow spaces and crevices. The cleaning apparatus in accordance with the present invention comprises:

(a) means for cleaning the area traversed;

(b) means for automatically propelling the cleaning apparatus in two mutually orthogonal directions over the area to be cleaned;

(c) means for detecting the position of the cleaning apparatus relative to its starting position;

(d) means for detecting obstacles located within the area being cleaned that hinder the motion of the cleaning apparatus;

(e) means for electrically powering the cleaning apparatus from a conventional electrical socket via a flexible electrical power cable;

(f) means for securely fastening the flexible electrical power cable to a conventional electrical socket;

(g) means for removing excessive slack from the flexible electrical power cable to ensure that the electrical power cable is taut at all times;

(h) means for detecting when the electrical power cable has looped around one or more obstacles that are located within the area being cleaned;

(i) means for operating the cleaning apparatus in a self-guided mode in which the path of motion of the cleaning apparatus is automatically determined and controlled so that the cleaning apparatus automatically traverses the entire area to be cleaned, avoids obstacles located within the area being cleaned, prevents looping of the electrical power cable around these obstacles, returns to the starting position, and alerts the operator upon completion of the cleaning operation via audio-visual signals;

(j) means for operating the cleaning apparatus in a manual mode where an operator guides the motion of the cleaning apparatus over the area to be cleaned using a detachable handle;

(k) means for operating the cleaning apparatus in a learning mode where an operator guides the motion of the cleaning apparatus over the area to be cleaned using a detachable handle to memorize the cleaning path;

(l) means for operating the cleaning apparatus in a programmed mode in which the cleaning apparatus traverses the path that has been pre-programmed and stored in memory; and (m) means for attaching a flexible suction hose to the cleaning apparatus to enable manual cleaning of narrow spaces and crevices.

The self-guiding means are based on search techniques that guarantee that all regions of an arbitrary shaped area are traversed and thereby cleaned. These search techniques have been modified so that the flexible electrical power cable does not loop around obstacles during motion of the cleaning apparatus.

The novel features of the invention are described in the appended claims, but the invention, in both organization and content, will be better understood and appreciated, from the following detailed description provided in conjunction with the drawings.

Most of the figures are for illustrative purposes only, and do not necessarily depict the actual relative sizes or positions of the elements shown.

DETAILED DESCRIPTION OF THE PREFERRED EMBODIMENT

Figure 1:
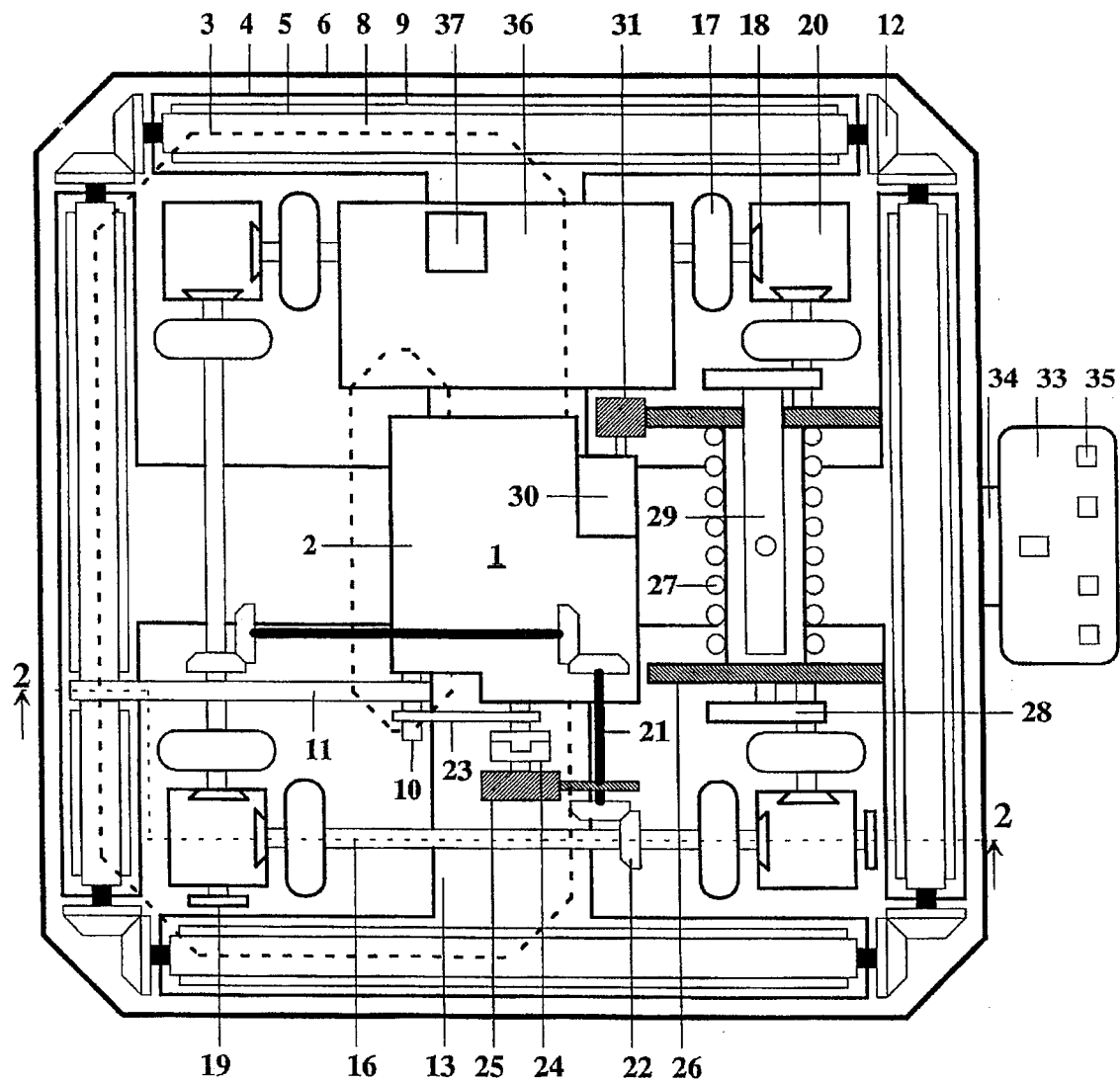
FIG. 1 is a plan view of the preferred embodiment of the cleaning apparatus.
Figure 2:
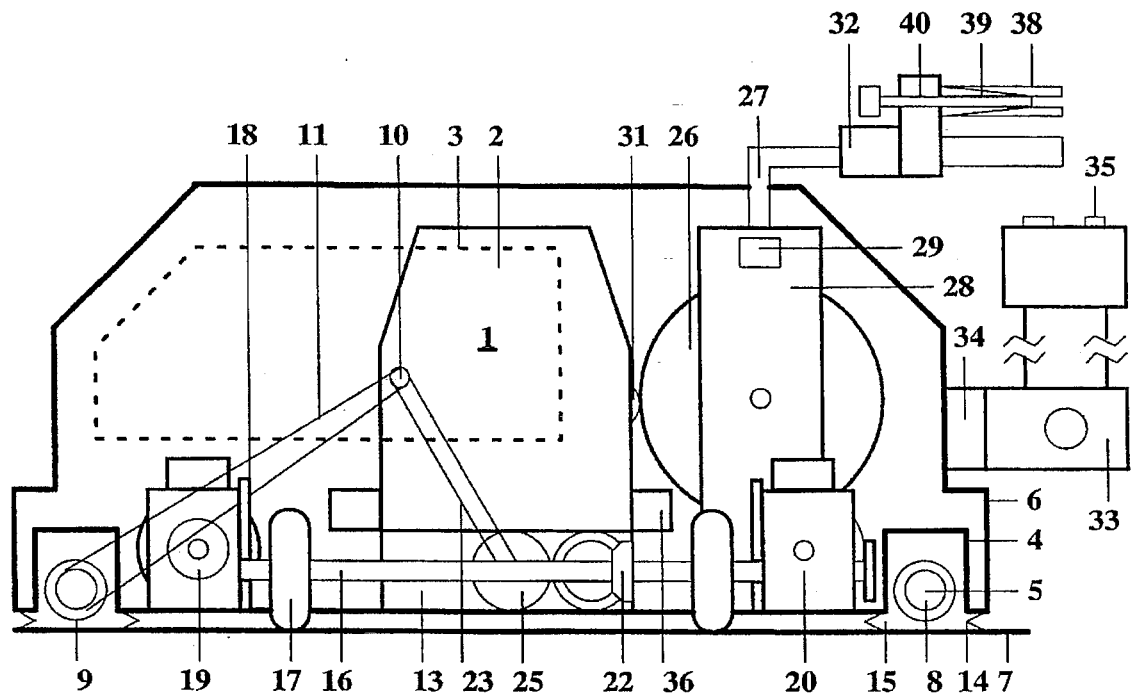
FIG. 2 is a sectional side view of the preferred embodiment of the cleaning apparatus.

An embodiment of the present invention is described with reference to the relevant figures. The major elements of the preferred embodiment of the self-guided, self-propelled, convertible cleaning apparatus which is the subject of the present invention are shown in FIG. 1 and FIG. 2.

The cleaning apparatus 1 comprises an electrically powered suction motor 2, a flexible dust collection bag 3 and rectangular suction nozzles 4 with agitator brushes 5, all of which are mounted in main body 6 which has a square bottom. Four sets of suction nozzles 4 and agitator brushes 5 arranged around the outer periphery of the bottom of main body 6 are employed to ensure complete cleaning of surface 7 on which the cleaning apparatus travels. Suction nozzles 4 in combination with agitator brushes 5 and suction motor 6 clean the surface 7. The number and placement of suction nozzles 4 and agitator brushes 5 may be varied to simplify construction. Each agitator brush 5 consists of spindle 8 with numerous filamentary brushes 9. One of the agitator brushes 5 is driven by suction motor spindle 10 via belt drive 11. The tension in belt drive 11 is set so that belt drive 11 slips when agitator brushes 5 get entangled and jammed in debris on surface 7. This prevents overload and burnout of suction motor 2. Suction motor 2 is reversible so that the direction of spindle 10 rotation can be reversed by electrical means. The remaining agitator brushes 5 are driven by bevel gears 12 mounted at the ends of agitator brushes 5. This ensures that all agitator brushes 5 are counter-rotating with the same rotational speed so that there is no tendency to move cleaning apparatus 1 in any particular direction. The dust collected by suction nozzles 4 and agitator brushes 5 is conveyed to suction motor 2 via passages 13 in main body 6. To improve cleaning efficiency, flexible skirt 14 may be attached to the underside of main body 6 along its periphery. Skirt 14 seals space 15 contained below each suction nozzle 4.

Four sets of axles 16 each with two driving wheels 17 are arranged parallel to the sides of main body 6. Driving wheels 17 support main body 6 off surface 7, as well as propel cleaning apparatus 1 along directions that are parallel to the sides of main body 6. Driving wheels 17 must provide good traction on a variety of surfaces 7. The traction provided by driving wheels 17 also ensures that the orientation of cleaning apparatus 1 is not altered during the motion of cleaning apparatus 1 over surface 7. Axles 16 are connected to main body 6 via adjustable supports 18. The clearance between the lower surface of main body 6, and surface 7 can be altered by adjusting supports 18. Two of the axles 16 have rotary encoders 19 that monitor the rotation of axles 16. Rotary encoders 19 are used for position detection and output signals corresponding to the position of cleaning apparatus 1. Supports 18 are fastened to retraction mechanism 20 which allows axles 16 and hence the driving wheels 17 to be retracted from surface 7. Retraction mechanism 20 is an electromechanical mechanism but hydraulic and pneumatic retraction mechanisms can also be used. When retraction mechanism 20 is extended, axles 16 are lowered and driving wheels 17 are brought into contact with surface 7. Thus the retraction mechanism 20 when in the extended position must be capable of supporting the weight and other loads applied to cleaning apparatus 1. In the retracted position, retraction mechanism 20 must support the weight of the axle 16 and driving wheels 17. In FIG. 2 two of the retraction mechanisms 20 are shown in the extended position while the other two are in the retracted position. This is the normal mode of operation so that at any instant only two sets of driving wheels 17 that propel the cleaning apparatus 1 in the desired direction are in contact with surface 7; the other sets of driving wheels 17 that propel the cleaning apparatus 1 in the orthogonal direction are retracted from surface 7. This arrangement of axles 16 and driving wheels 17 permits cleaning apparatus 1 to move in two mutually orthogonal directions. Two of the axles 16 which are mutually perpendicular are driven by drive shaft 21 via bevel gears 22. Bevel gears 22 on axle 16 and drive shaft 21 engage only when the corresponding retraction mechanism 20 is extended. Bevel gears 22 disengage from each other when the corresponding retraction mechanism 20 is retracted. Drive shafts 21 are connected to suction motor spindle 10 via belt drive 23, electromechanical clutch 24, and gear drive 25. Hydraulic or pneumatic clutches may be used instead of electromechanical clutch 24.

In order to propel cleaning apparatus 1 in a given direction, the appropriate retraction mechanisms 20 are energized which causes the corresponding axles 16 and driving wheels 17 to contact surface 7. Corresponding bevel gears 22 on axle 16 and drive shaft 21 also engage. Simultaneously the other two retraction mechanisms 20 are de-energized which causes the corresponding axles 16 and driving wheels 17 to retract from surface 1, and bevel gears 22 to disengage. Thus at any instant only a subset of the driving wheels 17 are rotating. Clutch 24 is then energized so as to transfer power from the suction motor spindle 10 to the driving wheels 17 thereby propelling cleaning apparatus 1 over surface 7. If movement in the opposite direction is desired, the direction of rotation of suction motor spindle 10 is reversed. The belt tension of belt drive 23 is set so that belt drive 23 slips, and driving wheels 17 stop rotating when the motion of cleaning apparatus 1 is impeded. Motion of cleaning apparatus 1 may be impeded by obstacles located within the area being cleaned.

A spool 26 for winding the flexible electrical power cable 27 is mounted within main body 6 via support 28. Electrical power cable 27 is guided onto the spool 26 by guide mechanism 29. Spool 26 and guide mechanism 29 constitute a conventional cable winch system. Guide mechanism 29 ensures that electrical power cable 27 is uniformly wound on spool 26. Reversible spool motor 30 drives spool 26 via gear drive 31 and is used to take in or let out electrical power cable 27. This provides a means for tensioning electrical power cable 27 to ensure that it remains taut at all times. The free end of electrical power cable 27 has an electrical plug 32 that can be securely fastened to an external power source such as a conventional electrical power socket. Spool 26 is designed to wind 25–50 feet of electrical power cable 27. For a 50 feet long electrical power cable 27, cleaning apparatus 1 can clean all regions that lie within a radius of 50 feet.

In order to increase the effective range and reduce the weight of cleaning apparatus 1, spool 26, guide mechanism 29, and spool motor 30 may be packaged in a separate housing that is stationary and located at the starting position of cleaning apparatus 1. Spool 26, electrical power cable 27, guide mechanism 29, and spool motor 30 may be also be replaced by an internal power source such as an on-board battery and charger system. Battery technology is undergoing continous improvement and high energy density, lightweight, low cost, rechargeable batteries may become available in the future.

A removable handle 33 may be attached to port 34 on main body 6. The removable handle bears controls 35 for energizing retraction mechanisms 20 and clutch 24 so that an operator can move cleaning apparatus 1 in any desired direction over surface 7. The handle is similar to a handle on a conventional manually operated cleaner and is designed so that an operator can comfortably operate cleaning apparatus 1 while standing. Additional switches (not shown) are provided on main body 6. These include a power switch for turning on and turning off electrical power to cleaning apparatus 1, a reset switch for resetting microcontroller system 36 when cleaning apparatus unexpectedly encounters an obstacle, and other switches that allow the operator to set the mode of operation. A conventional flexible suction hose (not shown) can also be attached to main body 6 to manually clean narrow spaces and crevices.

In the self-guided mode of operation cleaning apparatus 1 is controlled by a commercially available microcontroller system 36. A typical microcontroller system consists of a microprocessor that executes a software program, random access non-volatile memory for storing the software program and any data that needs to be stored for use in a subsequent cleaning session, random access memory for storing data generated during software program execution, input ports for monitoring the status of input devices such as sensors and switches, and output ports for actuating/powering electromechanical devices such as motors, relays, retraction mechanisms, buzzers and lamps. Any generic microcontroller system can be used for this application and no specific microcontroller system architecture is required. Several such generic microcontroller systems are now commercially available. The microcontroller system may be customized to enhance performance and reduce size and cost. If the microcontroller system is not capable of actuating/powering electromechanical devices, additional interface electronics may be necessary. Microcontroller system 36 monitors the output of rotary encoders 19 to determine the position of cleaning apparatus 1 relative to its starting or home position also termed the origin. Microcontroller system 36 executes instructions programmed into its random access non-volatile memory to determine the path of motion of cleaning apparatus 1. The instructions are typically in the form of a software program stored in the random access non-volatile memory of microcontroller system 36. Microcontroller system 36 then outputs signals to control suction motor spindle 10 rotation direction, energize/de-energize appropriate retraction mechanisms 20 and engage/disengage clutches 24, so that driving wheels 17 start rotating and cleaning apparatus 1 moves along the desired path, thereby cleaning surface 7. Microcontroller system 36 also controls an audible buzzer 37 for alerting an operator, and other interface electronics if necessary.

Electrical plug 32 is similar to a conventional 3-pin electrical plug, except that ground pin 38 is split with a tapered hole 39 drilled through the center. The other two power pins are similar to those for a conventional electrical plug. A screw 40 with an insulating head and shank is screwed into tapered hole 39. To securely fasten electrical plug 32 to a conventional electrical socket, screw 40 is advanced into tapered hole 39, so as to increase the effective diameter of ground pin 38. This expanded ground pin 38 will now fit firmly in the electrical socket thereby securing electrical plug 32 to the electrical socket. To remove electrical plug 32 from the electrical socket, screw 40 is withdrawn from tapered hole 39, and electrical plug 32 is withdrawn from the electrical socket. In this manner a means for fastening electrical power cable 27 to an external electrical power socket is provided.

Figure 3:
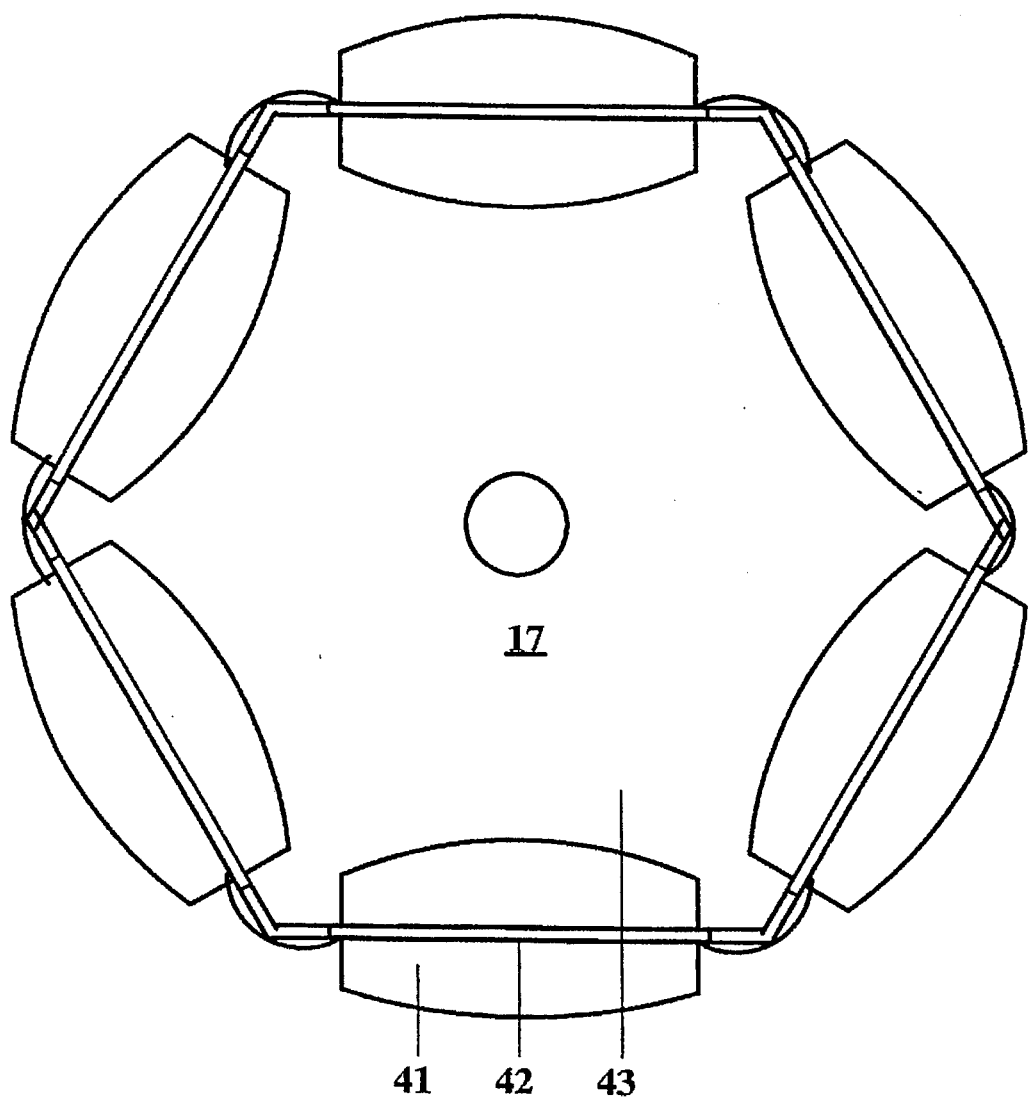
FIG. 3 is a sectional side view of an alternative embodiment of the driving wheel.

FIG. 3 shows an alternative embodiment of driving wheels 17 which are designed so that they provide good traction in the direction of rotation, but also permit translation in a transverse direction. Driving wheel 17 consists of numerous rollers 41 around the periphery. Rollers 41 rotate freely on shafts 42, and are shaped so that the outer cylindrical edges of all rollers 41 lie along the circumference of a circle. This ensures that the clearance between surface 7 and main body 6 remains constant as driving wheel 17 rotates. Shafts 42 are mounted in wheel frame 43. FIG. 3 shows six rollers 41, although the number may be varied to simplify construction. This special construction of driving wheels 17 enables cleaning apparatus 1 to move in two mutually orthogonal directions without the need to retract any of the driving wheels 17 from surface 7, or the need for a complicated steering mechanism. The traction provided by driving wheels 17 also ensures that the orientation of cleaning apparatus 1 is not altered during the motion of cleaning apparatus 1 over surface 7 obviating the need for a gyroscope or alternative orientation sensors.

Figure 4A:
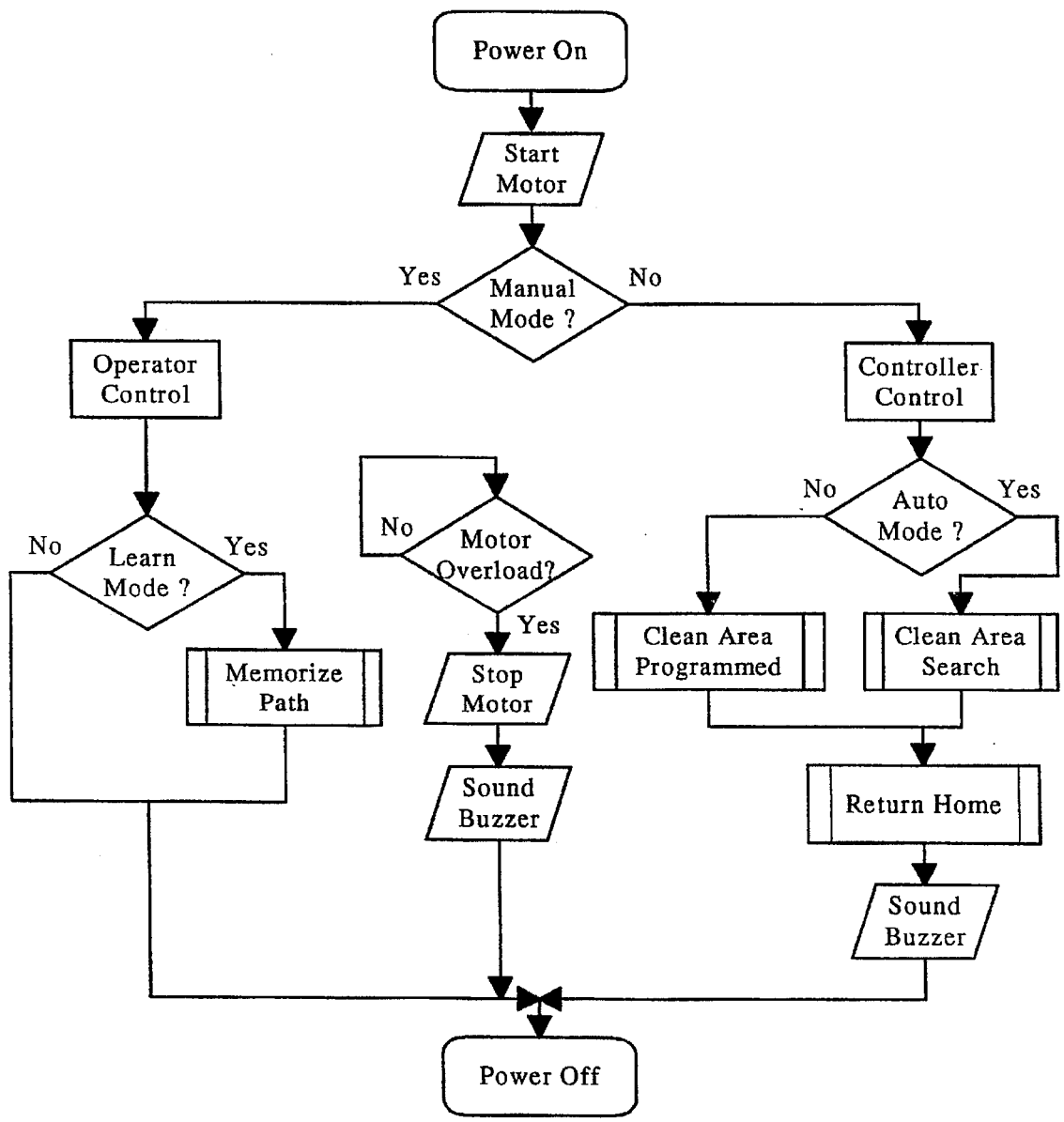
FIGS. 4a–4j are flowcharts of the preferred embodiment of the control operation of the cleaning apparatus.

FIGS. 4a–4j show the flowchart and principal elements of the microcontroller software program. Only selected highlights of the software program that elucidate the principal aspects are illustrated. FIG. 4a shows the sequence of operations at the highest level. Operations that are explained in greater detail in subsequent figures are shown in a procedure box. As an example, the procedure 'Clean Area Search' is shown in a procedure box. After the electrical power is switched on, suction motor 2 turns on. The operator can then decide upon the mode of operation. If the manual mode is selected, microcontroller system 36 enables all the motion controls on the removable handle of cleaning apparatus 1, and hands over control to the operator. The operator can then select if the teaming mode is to be enabled by setting the switches on main body 6. The operator then manipulates the motion controls on the handle to move cleaning apparatus 1 over the area to be cleaned. By setting the switches on main body 6, the operator also has the option of disengaging clutch 24 and physically pushing or dragging cleaning apparatus 1 over the surface to be cleaned. If the learning mode has been enabled, cleaning apparatus 1 memorizes the path of travel as the operator moves cleaning apparatus 1 over the surface to be cleaned. After the operator has finished cleaning the desired areas, the operator turns off the electrical power to cleaning apparatus 1. If the learning mode has been enabled, the memorized path is stored in the non-volatile random access memory of microcontroller system 36 for use in a subsequent cleaning session.

In the self-guided mode, microcontroller system 36 first determines if the operator has selected the auto mode of operation or the programmed mode of operation. These options are selected by setting the switches on main body 6. If the programmed mode of operation is detected, microcontroller system 36 assumes control of cleaning apparatus 1 and executes procedure 'Clean Area Programmed' which guides cleaning apparatus 1 over the path that has been memorized during a prior cleaning session. If the auto mode of operation is detected, microcontroller system 36 assumes control of cleaning apparatus 1, and executes procedure 'Clean Area Search' which guides cleaning apparatus 1 automatically along a path determined by a tree search. Upon completion of cleaning, cleaning apparatus 1 returns home and sounds buzzer 37 to alert the operator. The operator can then turn off the electrical power to cleaning apparatus 1. The path of motion of cleaning apparatus 1 is selected so that it traverses the entire area to be cleaned, avoids obstacles located within the area being cleaned, and prevents looping of electrical power cable 27 around these obstacles. Microcontroller system 36 continuously monitors the condition of suction motor 2. If suction motor 2 gets overloaded (e.g. when agitator brushes 5 get entangled in debris on surface 7), suction motor 2 is stopped and buzzer 37 is sounded to alert the operator.

One of the requirements of the self-guiding feature during the auto mode of operation is the ability to clean an arbitrarily shaped area starting from any arbitrary point within this area, without any pre-determined knowledge of the size and shape of this area. Thus the algorithm for the 'Clean Area Search' operation must satisfy this requirement. One natural phenomenon that can be exploited to generate such an algorithm is the spread of liquid on a level surface. Whatever be the point on the surface at which the liquid is poured, the liquid flows around obstacles on the surface, and spreads uniformly until the boundaries of the surface are encountered. This phenomenon can be represented as a breadth-first search of a search tree representing the region. Another well known algorithm is the depth-first search technique. If the operator wants only a small region around the starting position to be cleaned, the breadth-first search option must be chosen. If however, the entire area that lies within the reach of the cleaning apparatus 1 is to be cleaned, the depth-first search option must be chosen. These options are selected by setting the switches on main body 6. The 'Clean Area Search' procedure executes the 'Clean Area Depth First' procedure if the depth-first search option has been selected. The 'Clean Area Search' procedure executes the 'Clean Area Breadth First' procedure if the breadth-first search option has been selected. The depth-first search minimizes the total path length of travel of cleaning apparatus 1 while traversing the area being cleaned. A shorter total path length translates to a shorter total cleaning time which is desirable.

For either type of search, the software program defines the area to be cleaned as a grid with nodes defined at intervals of a unit length with the starting position as the home position or origin. A unit length is some pre-defined fraction of the length of suction nozzles 4. This ensures that there is a slight overlap in the path traveled by cleaning apparatus 1. Each node can be identified in terms of two coordinates (X,Y), with X denoting the number of units the node is away from the origin in one direction, and Y denoting the number of units the node is away from the origin in the orthogonal direction. Software program maintains three lists in the memory of microcontroller system 36. The first is a list of all nodes stored in the order in which they were cleaned called the 'Cleaned List', the second is a list of all nodes that have been determined to be occupied by obstacles called the 'Obstacle List', and the third is a list of all nodes in sequence which electrical power cable 27 crosses called the 'Cable List'. The 'Obstacle List' is not essential, but its use speeds up execution of the software program. The 'Cable List' is an internal representation of the position of electrical power cable 27 maintained by microcontroller system 36. While the 'Cable List' is a list of nodes in sequence which electrical power cable 27 crosses, the actual electrical power cable 27 may not necessarily pass through these nodes. The number of nodes crossed by electrical power cable 27 (i.e. number of nodes in the 'Cable List') is recorded as the length of electrical power cable 27 that has been unwound from spool 26. Both the 'Clean Area Depth First' and the 'Clean Area Breadth First' procedures begin by setting (X,Y) to (0,0) since the home or starting position is identical to the origin of the nodal coordinate system. At the start of the operation, both the 'Cleaned List' and the 'Cable List' contain only one element which is the node corresponding to the home position (0,0), while the 'Obstacle List' is empty. All three lists get updated as cleaning apparatus 1 traverses the area being cleaned. An iterative procedure is used to traverse and clean the entire area while ensuring that electrical power cable 27 does not loop around obstacles.

Four additional variables are associated with each of the nodes in the 'Cleaned List'. These four variables indicate if the nodes to the right (X+1,Y), front (X,Y+1), left (X−1,Y), and back (X,Y−1) are clear (i.e. have not been visited before from (X,Y)). These four variables are 'Right', 'Front', 'Left' and 'Back'.

Figure 5:
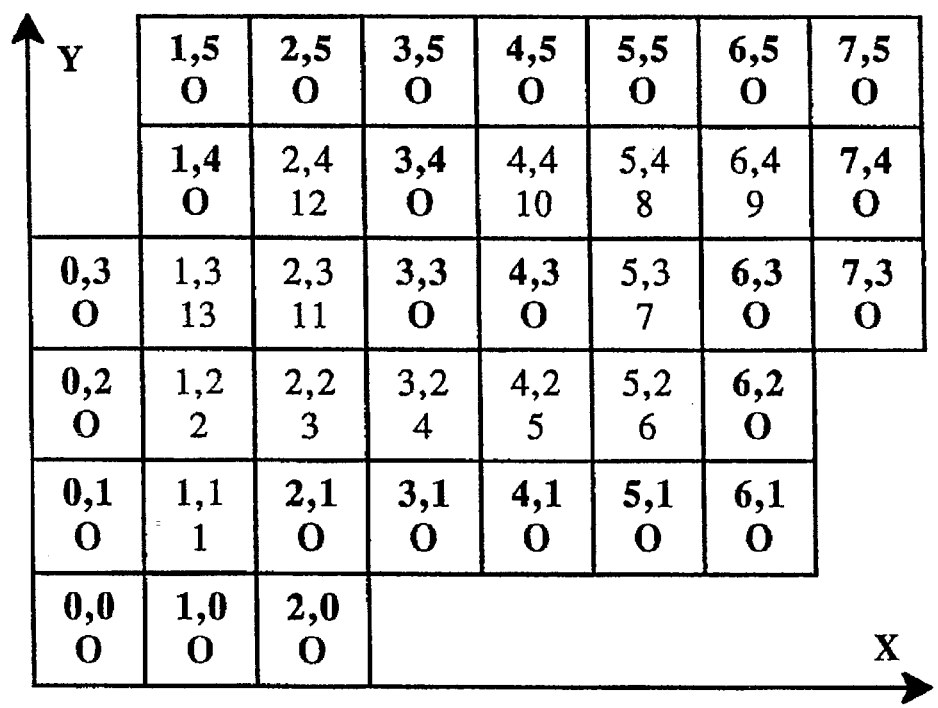
FIG. 5 is a plan view of a room containing obstacles that has been represented as a series of nodes and cleaned using a depth-first search algorithm.
Figure 6:
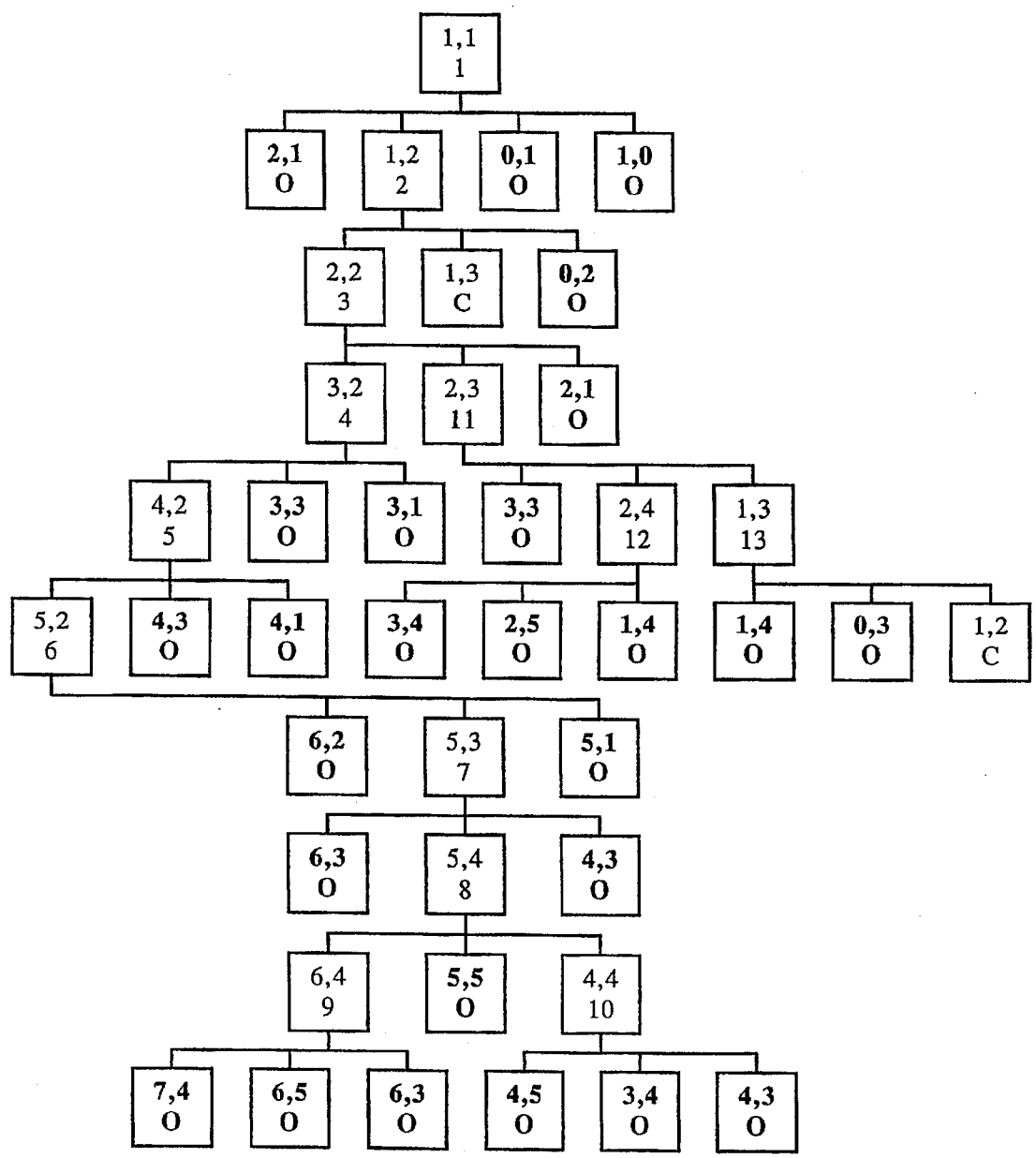
FIG. 6 is a search tree representation of the nodes indicated in FIG. 5.

In addition to the (X,Y) coordinates of the nodes that have been cleaned, the 'Ancestor Node' of the node is also stored in the 'Cleaned List'. The concept of an 'Ancestor Node' of a node is explained with reference to FIGS. 5 and 6. FIG. 5 shows the plan view of a room that has been subdivided by grid lines. A node is located at the intersection of each pair of grid lines. Each node is represented by two coordinates; for example one of the nodes is (1,1) and for illustration this is taken to be the starting position of cleaning apparatus 1. Microcontroller system 36 internally records the starting position as node (0,0), but the starting position in FIGS. 5–8 is shown as node (1,1) for illustrative purposes only so that the coordinates of all nodes are positive. Nodes that are blocked by walls or obstacles are indicated as O. For example, nodes (0,0), (1,0) and (2,0) are nodes that are blocked by obstacles or walls. FIG. 6 shows a search tree representation of the nodes in the room. In the search tree, the nodes are arranged in a hierarchical order with the starting position being the highest level or root node. In general, each node in the tree has three descendant nodes unless the node is blocked by an obstacle or the node is the root node. If the node is blocked by an obstacle the tree terminates at that node. The tree also terminates at a node if the node is already in the 'Cleaned List'; i.e. has been cleaned before. The root node has four descendant nodes. Each of the descendant nodes is an immediate neighbor of the ancestor node. The room shown in FIG. 5 can be represented as a 10 level search tree. The starting position of cleaning apparatus 1 (e.g. node (1,1)) is termed the root node. The root node has four descendant nodes which are (2,1), (1,2), (0,1) and (1,0). These are the immediate neighbors of the root node (1,1). Node (1,1) is termed a direct ancestor of the descendant nodes (2,1), (1,2), (0,1) and (1,0). At the next level, nodes (2,1), (0,1) and (1,0) do not have any descendant nodes since they are blocked by obstacles. Node (1,2) has three descendant nodes (2,2), (1,3) and (0,2). Node (1,1) is the ancestor of node (1,2) and thus is not considered to be the descendant of node (1,2). Node (1,1) is also considered an ancestor of nodes (2,2), (1,3) and (0,2), since it is an ancestor of their direct ancestor node (1,2). To further illustrate this concept, node (3,4) which is a tenth level node in the search tree has 9 ancestors which in order are (4,4), (5,4), (5,3), (5,2), (4,2), (3,2), (2,2), (1,2) and (1,1). Since the 'Ancestor Node' of a particular node is stored as a part of the 'Cleaned List' the list of ancestor nodes of a given node can be generated. The search tree cannot be generated without pre-defined knowledge of the area being cleaned and the obstacles located within this area. Thus the search tree is constructed by cleaning apparatus 1 as it traverses the region being cleaned. This procedure can be understood with reference to the flowchart of FIG. 4b.

Figure 4B:
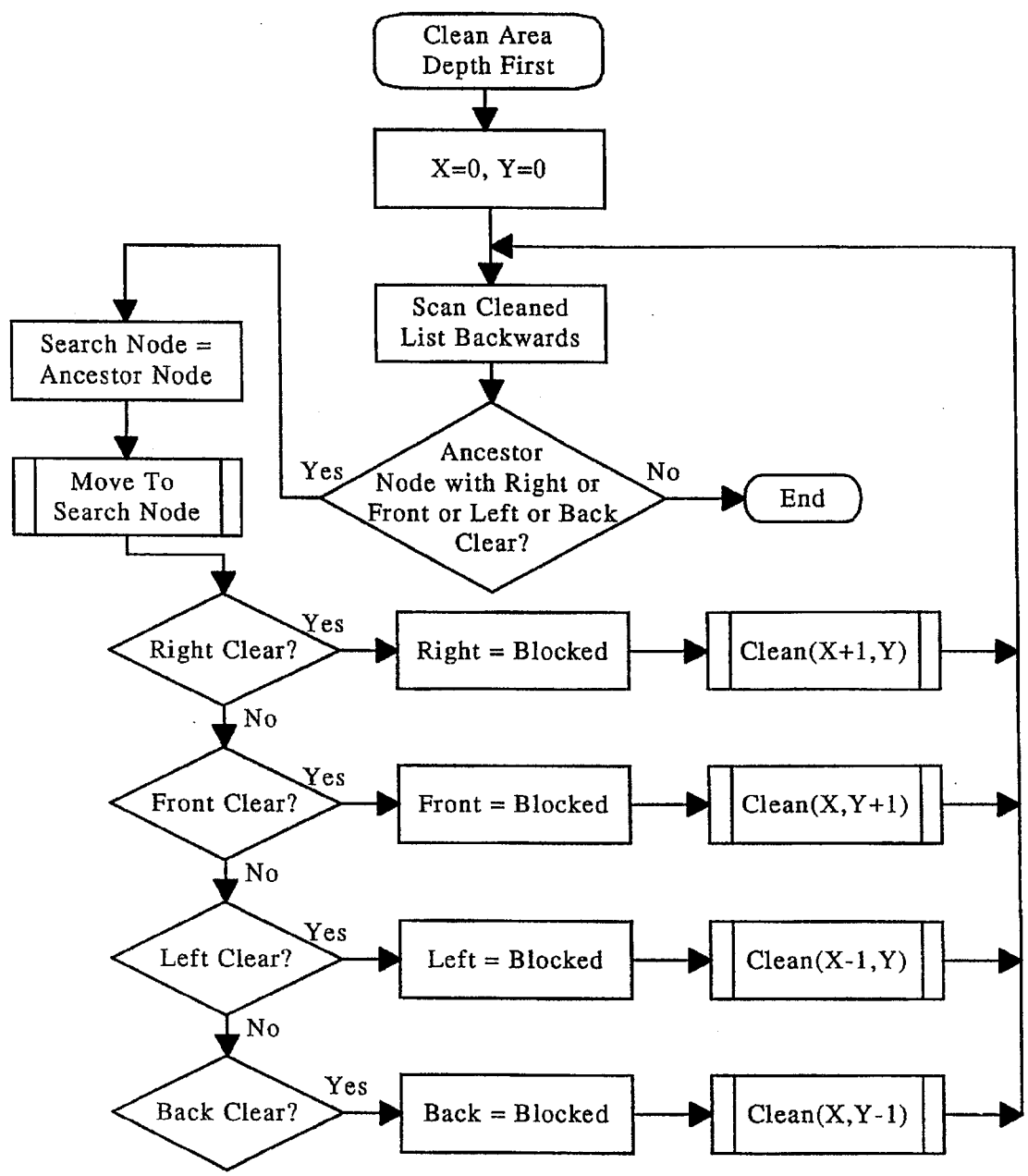

FIG. 4b shows the flowchart for the depth-first search procedure 'Clean Area Depth First'. The procedure 'Clean Area Depth First' begins by setting (X,Y) to (0,0) since the starting or home position is identical to the origin of the nodal coordinate system. The 'Cleaned List' is scanned backwards (i.e. last node in the list to the first node in the list) to identify an 'Ancestor Node' of the last node in the 'Cleaned List' that has its 'Right' or 'Left' or 'Front' or 'Back' variables clear. If such an 'Ancestor Node' is found, the 'Search Node' is set to the 'Ancestor Node' and the 'Move To Search Node' procedure is executed. This procedure moves the cleaning apparatus 1 from its present position to the 'Search Node'. If the 'Right' variable is clear, the 'Right' variable is marked as blocked, and 'Clean (X+1,Y)' procedure is executed. If the 'Front' variable is clear, the 'Front' variable is marked as blocked, and 'Clean (X,Y+1)' procedure is executed. If the 'Left' variable is clear, the 'Left' variable is marked as blocked, and 'Clean (X−1,Y)' procedure is executed. If the 'Back' variable is clear, the 'Back' variable is marked as blocked, and 'Clean (X,Y−1)' procedure is executed. This loop is iteratively executed. When the last node in the 'Cleaned List' and all its 'Ancestor Nodes' in the 'Cleaned List' have their 'Right', 'Left', 'Front' and 'Back' variables blocked, the entire area has been cleaned, and the cleaning operation is complete.

The operation of the depth-first search procedure can be explained with reference to FIGS. 4b, 5 and 6. At the start of the cleaning operation, the cleaning apparatus 1 is at node (1,1) and this is the only node in the 'Cleaned List'. Initially all four variables 'Right', 'Front', 'Left' and 'Back' for node (1,1) are clear. Cleaning apparatus 1 attempts to move to (2,1) but cannot move to this node as an obstacle is encountered. Node (2,1) is added to the 'Obstacle List', and the 'Right' variable is marked as blocked. The 'Cleaned List' is scanned backwards and node (1,1) is discovered which has its 'Front' variable clear. Cleaning apparatus 1 moves in this direction to node (1,2). This move is successful since this node is free of obstacles. Node (1,2) is added to the 'Cleaned List'. Also the 'Front' variable of node (1,1) is marked as blocked and node (1,1) is recorded as the ancestor of node (1,2). When the 'Cleaned List' is scanned backwards, node (1,2) is discovered that has its 'Right' variable clear. Cleaning apparatus 1 moves in this direction to node (2,2). Node (2,2) is added to the 'Cleaned List', the 'Right' variable of node (1,2) is marked as blocked, and node (1,2) is recorded as the ancestor of node (2,2). In an analogous manner, cleaning apparatus 1 moves to nodes (3,2), (4,2), (5,2), (5,3), (5,4) and (6,4) in succession. From node (6,4) no further movement is possible since all its descendant nodes are obstacles. All four variables 'Right', 'Front', 'Left' and 'Back' for node (6,4) are marked as blocked. At this point, the 'Cleaned List' has the following 9 nodes: (1,1), (1,2), (2,2), (3,2), (4,2), (5,2), (5,3), (5,4) and (6,4). When this list is scanned backwards for ancestors of node (6,4), node (5,4) is discovered that has its 'Front' variable clear. Cleaning apparatus 1 attempts to move to node (5,5) which is not successful as node (5,5) is blocked by an obstacle. The 'From' variable of node (5,4) is marked as blocked. The 'Cleaned List' is scanned backwards for ancestors of node (6,4), and node (5,4) is discovered that has its 'Left' variable clear. Cleaning apparatus 1 moves in this direction to node (4,4). Since the move is successful, node (4,4) is added to the 'Cleaned List', the 'Left' variable of node (5,4) is marked as blocked, and node (5,4) is recorded as the ancestor of node (4,4). This is the tenth node in the 'Cleaned List'. From (4,4), cleaning apparatus 1 cleans nodes (2,3), (2,4) and (1,3) in succession. In this manner, all nodes that are free of obstacles are cleaned. The order in which the nodes are cleaned during the depth-first search are marked on FIG. 5. In this technique a branch of the search tree is traced all the way to its termination before a sister branch is explored; thus the nomenclature 'depth-first'. At the end of the search, the 'Cleaned List' has the elements shown in Table 1.

TABLE 1

| Element | 1 | 2 | 3 | 4 | 5 | 6 | 7 | 8 | 9 | 10 | 11 | 12 | 13 |
|---|---|---|---|---|---|---|---|---|---|---|---|---|---|
| X | 1 | 1 | 2 | 3 | 4 | 5 | 5 | 5 | 6 | 4 | 2 | 2 | 1 |

TABLE 1-continued

| Y | 1 | 2 | 2 | 2 | 2 | 2 | 3 | 4 | 4 | 4 | 3 | 4 | 3 |
|---|---|---|---|---|---|---|---|---|---|---|---|---|---|
| Ancestor | 0 | 1 | 2 | 3 | 4 | 5 | 6 | 7 | 8 | 8 | 3 | 11 | 11 |

The 'Cleaned List' has 13 elements; each element stores the (X,Y) location of the node and the identity of its direct ancestor in the 'Cleaned List'. For example, the (X,Y) coordinates of element 10 are (4,4). The direct ancestor of node (4,4) is element 8 in the 'Cleaned List' which is node (5,4). The list of all ancestors of a given node can be generated very easily. For example, the ancestor of element 13 is element 11, the ancestor of element 11 is element 3, the ancestor of element 3 is element 2, and the ancestor of element 2 is element 1. The ancestors of element 13 therefore are 11, 3, 2 and 1, and the corresponding ancestor nodes are (2,3), (2,2), (1,2) and (1,1). Note that the 'Right', 'Front', 'Left' and 'Back' variables associated with each of the elements in the 'Cleaned List' have not been shown in Table 1. Since the search tree is generated as the cleaning apparatus 1 traverses the region, no prior knowledge of the size and shape of the region and location of obstacles within that region is necessary. Thus truly self-guided motion can be achieved. Such self-guided motion is also possible by implementing the breadth-first search procedure.

Figure 4C:
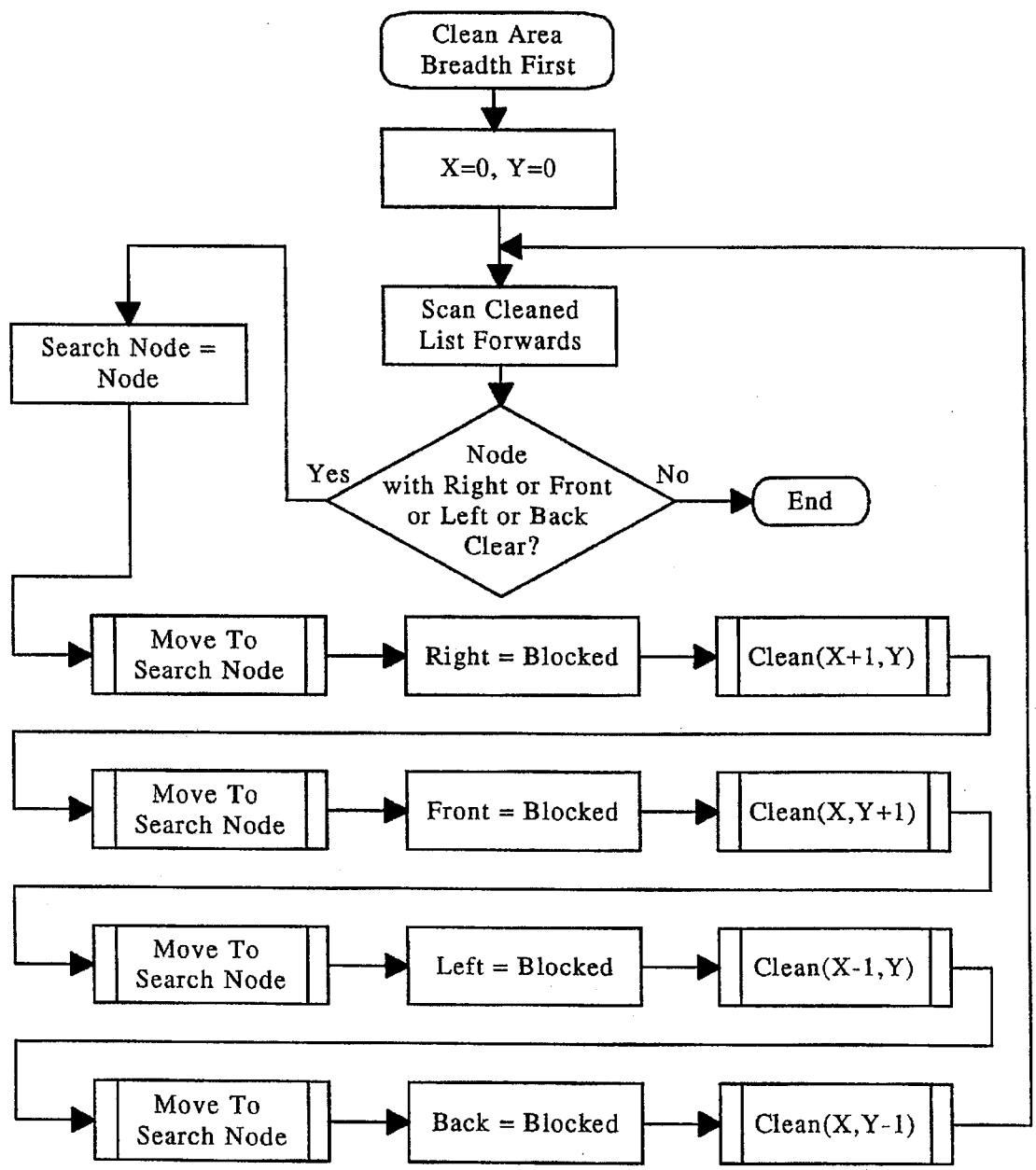

FIG. 4c shows the flowchart for the breadth-first search procedure 'Clean Area Breadth First'. Many of the concepts are similar to those for the depth-first search, but this procedure has been described in detail for the sake of completeness. The procedure 'Clean Area Breadth First' begins by setting (X,Y) to (0,0) since the starting or home position is identical to the origin of the nodal coordinate system. The 'Cleaned List' is scanned forwards (i.e. first node in the list to the last node in the list) to identify a node in the 'Cleaned List' that has its 'Right' or 'Left' or 'Front' or 'Back' variables clear. If such a node is found, the 'Search Node' is set to this node and the 'Move To Search Node' procedure is executed. This procedure moves the cleaning apparatus 1 from its present position to the 'Search Node'. If the 'Right' variable is clear, the 'Right' variable is marked as blocked, and 'Clean (X+1,Y)' procedure is executed. Next the 'Move To Search Node' procedure is executed, the 'Front' variable is marked as blocked, and 'Clean (X,Y+1)' procedure is executed. Next the 'Move To Search Node' procedure is executed, the 'Left' variable is marked as blocked, and 'Clean (X−1,Y)' procedure is executed. Finally the 'Move To Search Node' procedure is executed, the 'Back' variable is marked as blocked, and 'Clean (X,Y−1)' procedure is executed. This loop is iteratively executed. When all nodes in the 'Cleaned List' have their 'Right', 'Left', 'Front' and 'Back' variables blocked the entire area has been cleaned, and the cleaning operation is complete.

The operation of the breadth-first search procedure can be explained with reference to FIGS. 4c, 7 and 8. At the start of the cleaning operation, the cleaning apparatus 1 is at node (1,1) and this is the only node in the 'Cleaned List'. Initially all four variables 'Right', 'Front', 'Left' and 'Back' for node (1,1) are clear. Cleaning apparatus 1 attempts to move to (2,1) but cannot move to this node as an obstacle is encountered. Node (2,1) is added to the 'Obstacle List', and the 'Right' variable is marked as blocked. The 'Cleaned List' is scanned forwards and node (1,1) is discovered which has its 'Front' variable clear. Cleaning apparatus moves in this direction to node (1,2). This move is successful since this node is free of obstacles. Node (1,2) is added to the 'Cleaned List'. Also the 'Front' variable of node (1,1) is marked as blocked and node (1,1) is recorded as the ancestor of node (1,2). When the 'Cleaned List' is scanned forwards, node (1,1) is discovered that has its 'Left' variable clear. Cleaning apparatus 1 attempts to move in this direction to node (0,1). The move is not successful since node (0,1) is blocked and the 'Left' variable is marked as blocked. Similarly the move to node (1,0) is unsuccessful since node (1,0) is blocked. The 'Back' variable of node (1,1) is marked as blocked. Now all four variables 'Right' or 'Left' or 'Front' or 'Back' variables of node (1,1) are blocked. When the 'Cleaned List' is scanned forwards, node (1,2) is discovered that has its 'Right' variable clear. Cleaning apparatus 1 moves in this direction to node (2,2). Node (2,2) is added to the 'Cleaned List', the 'Right' variable of node (1,2) is marked as blocked, and node (1,2) is recorded as the ancestor of node (2,2). In an analogous manner, cleaning apparatus 1 moves to nodes (1,3), (3,2), (2,3), (4,2), (2,4), (5,2), (5,3), (5,4) and (6,4) in succession. From node (6,4) no further movement is possible since all its descendant nodes are obstacles. All four variables 'Right', 'Front', 'Left' and 'Back' for node (6,4) are marked as blocked. At this point, the 'Cleaned List' has the following 12 nodes: (1,1), (1,2), (2,2), (1,3) (3,2), (2,3), (4,2), (2,4), (5,2), (5,3), (5,4) and (6,4). When this list is scanned forwards node (5,4) is discovered that has its 'Front' variable clear. Cleaning apparatus 1 attempts to move to node (5,5) which is not successful as node (5,5) is blocked by an obstacle. The 'Front' variable of node (5,4) is marked as blocked. The 'Cleaned List' is scanned forwards and node (5,4) is discovered that has its 'Left' variable clear. Cleaning apparatus 1 moves in this direction to node (4,4). Since the move is successful, node (4,4) is added to the 'Cleaned List', the 'Left' variable of node (5,4) is marked as blocked, and node (5,4) is recorded as the ancestor of node (4,4). This is the thirteenth node in the 'Cleaned List'. From (4,4), no further motion of cleaning apparatus 1 is possible since all its descendant nodes are blocked. Thus all four variables 'Right', 'Front', 'Left' and 'Back' for node (4,4) are marked as blocked. When the 'Cleaned List' is scanned forwards all nodes have their 'Right', 'Front', 'Left' and 'Back' variables blocked and cleaning operation is complete. In this manner, all nodes that are free of obstacles are cleaned. The order in which the nodes are cleaned during the breadth-first search are marked on FIG. 7. It is seen that in this technique all nodes at a given level in the search tree are explored before cleaning apparatus 1 moves to the nodes in the next level; thus the nomenclature 'breadth-first'. At the end of the search, the 'Cleaned List' has the elements shown in Table 2.

TABLE 2

| Element | 1 | 2 | 3 | 4 | 5 | 6 | 7 | 8 | 9 | 10 | 11 | 12 | 13 |
|---|---|---|---|---|---|---|---|---|---|---|---|---|---|
| X | 1 | 1 | 2 | 1 | 3 | 2 | 4 | 2 | 5 | 5 | 5 | 6 | 4 |
| Y | 1 | 2 | 2 | 3 | 2 | 3 | 2 | 4 | 2 | 3 | 4 | 4 | 4 |
| Ancestor | 0 | 1 | 2 | 2 | 3 | 3 | 5 | 6 | 7 | 9 | 10 | 11 | 11 |

The 'Cleaned List' has 13 elements; each element stores the (X,Y) location of the node and the identity of its direct ancestor in the 'Cleaned List'. For example, the (X,Y) coordinates of element 10 are (5,3). The direct ancestor of element 10 is element 9 in the 'Cleaned List' which is node (5,2). The list of all ancestors of a given node can be generated very easily. For example, the ancestor of element 7 is element 5, the ancestor of element 5 is element 3, the ancestor of element 3 is element 2, and the ancestor of element 2 is element 1. The ancestors of element 7 therefore are 5, 3, 2 and 1, and the corresponding ancestor nodes are (3,2), (2,2), (1,2) and (1,1). Note that the 'Right', 'Front', 'Left' and 'Back' variables associated with each of the elements in the 'Cleaned List' have not been shown in Table 2. Since the search tree is generated as the cleaning apparatus 1 traverses the area, no prior knowledge of the size and shape of the area and location of obstacles within that area is necessary. Thus truly self-guided motion can be achieved.

Figure 7:
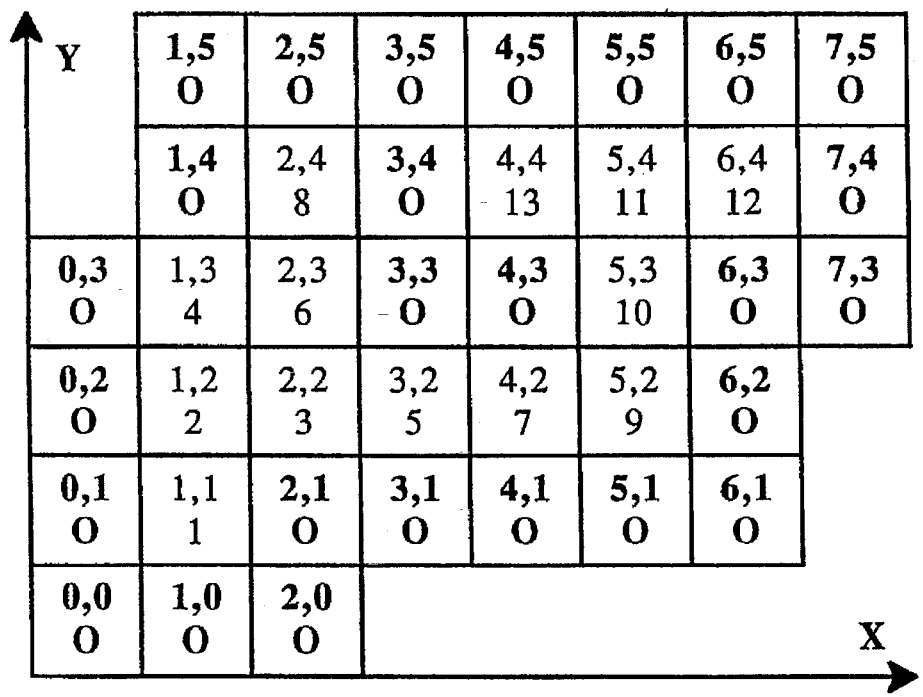
FIG. 7 is a plan view of a room containing obstacles that has been represented as a series of nodes and cleaned using a breadth-first search algorithm.
Figure 8:
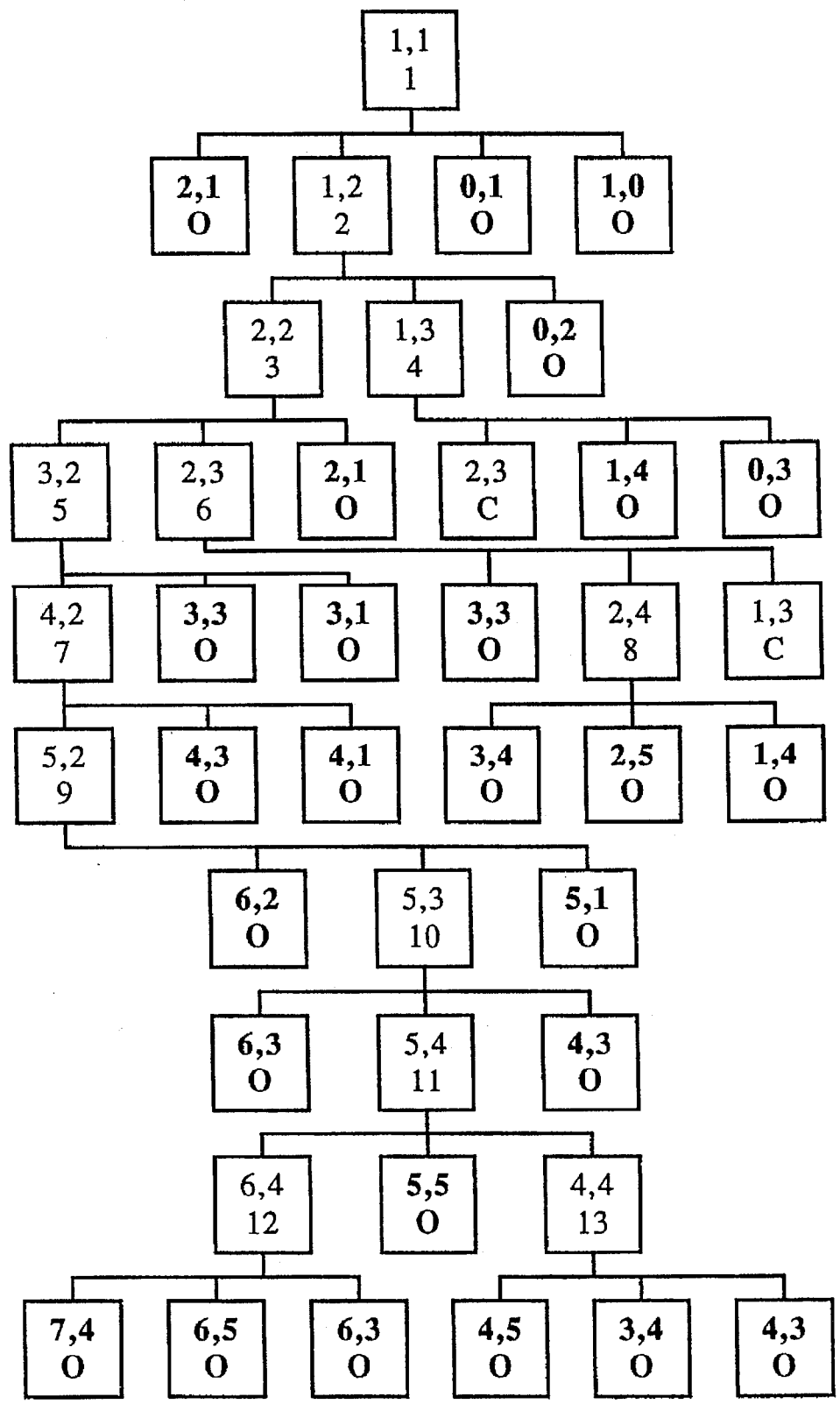
FIG. 8 is a search tree representation of the nodes indicated in FIG. 7.

By comparing the physical path length traversed by the cleaning apparatus 1 during the depth-first search shown in FIG. 5 and the breadth-first search shown in FIG. 7, it is clear that the total path length traversed is much shorter for the depth-first search technique. Thus it is the preferred search technique for this application. Other combinations and variations of the depth-first and breadth-first search are possible which may be optimum for specific applications.

Figure 4D:
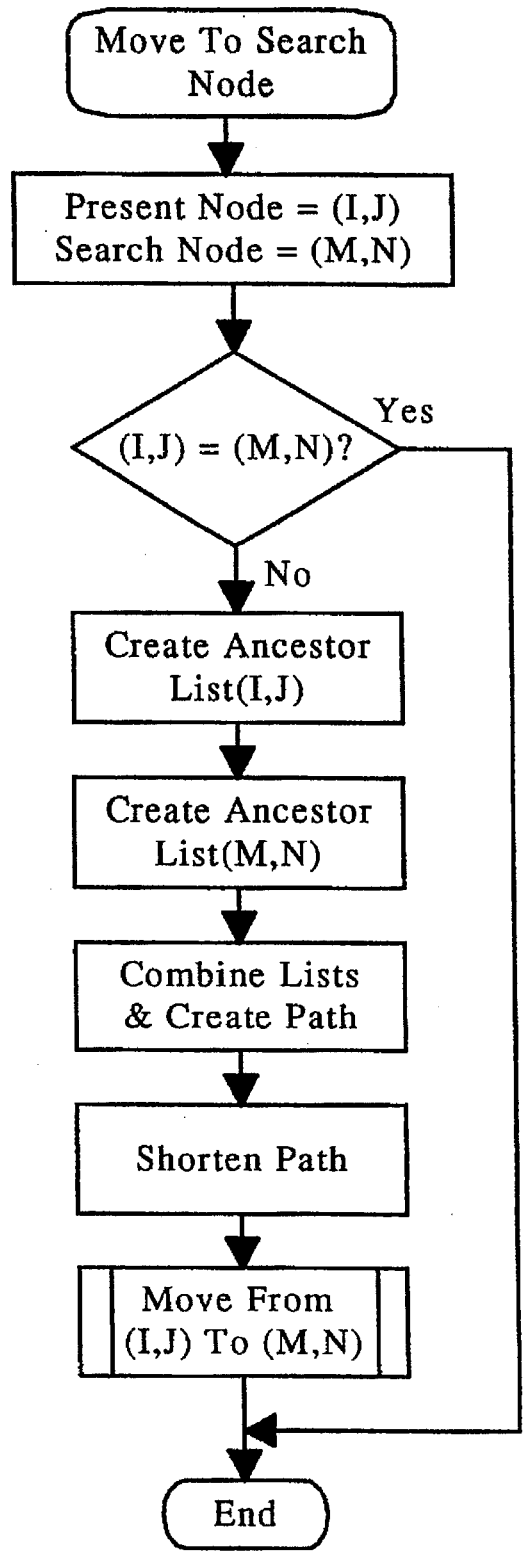

The operation of the 'Move To Search Node' procedure is illustrated in FIG. 4d. The 'Present Node' is denoted as (I,J) and the 'Search Node' is denoted as (M,N). The 'Present Node' is the present position of cleaning apparatus 1. If the 'Present Node' and the 'Search Node' are not identical, a path from (I,J) to (M,N) needs to be constructed. This is done by concatenating the ancestor lists for nodes (I,J) and (M,N) to construct a path, and shortening the path using the 'Shorten Path' procedure. The nodes in the path are stored in a 'Path List'. Once the path has been constructed the cleaning apparatus moves along this path using the procedure 'Move From (I,J) to (M,N)' so that cleaning apparatus 1 arrives at the node (M,N). The 'Move To Search Node' procedure can be better understood by way of example. In the breadth-first search shown in FIGS. 7 and 8, consider a move from 'Present Node' (4,2) to 'Search Node' (2,3). The ancestor list for node (4,2) is (3,2), (2,2), (1,2) and (1,1). The ancestor list for node (2,3) is (2,2), (1,2) and (1,1). The procedure for creating an ancestor list from the 'Cleaned List' is the same as described earlier. Concatenating these lists, a 'Path List' containing 9 elements is created as shown in Table 3.

TABLE 3

| Element | 1 | 2 | 3 | 4 | 5 | 6 | 7 | 8 | 9 |
|---|---|---|---|---|---|---|---|---|---|
| X | 4 | 3 | 2 | 1 | 1 | 1 | 1 | 2 | 2 |
| Y | 2 | 2 | 2 | 2 | 1 | 1 | 2 | 2 | 3 |

Cleaning apparatus 1 can move from (4,2) to (2,3) by moving sequentially to each of the nodes in the 'Path List'. Each element in the 'Path List' is adjacent to the node corresponding to the next element and is also free of obstacles since it is a member of the 'Cleaned List'. Two nodes are deemed to be adjacent if any two of their corresponding coordinates are identical, while the other set of coordinates differ by unity. Thus node (1,2) which is element 4 in the 'Path List' is adjacent to nodes (2,2) and (1,1) which are elements 3 and 5 respectively in the 'Path List'. However, this path is unnecessarily long. As can be seen in FIG. 7, cleaning apparatus 1 can move from (4,2) to (2,3) using the path (4,2), (3,2), (2,2) and (2,3). This shortened path is created by the 'Shorten Path' procedure. The 'Shorten Path' procedure examines the 'Path List' to search for two nodes that are adjacent to each other. If two such nodes are found, all the intervening elements in the 'Path List' are deleted and a shortened 'Path List' is generated. This procedure is iteratively executed until no further shortening of the 'Path List' is possible. For the 'Path List' shown above, nodes corresponding to elements 2 and 8 are adjacent to each other. Elements 3, 4, 5, 6, and 7 are deleted from the 'Path List' to create a shorter 4 element 'Path List' as shown in Table 4.

TABLE 4

| Element | 1 | 2 | 3 | 4 |
|---|---|---|---|---|
| X | 4 | 3 | 2 | 2 |
| Y | 2 | 2 | 2 | 3 |

This is the shortest path between (4,2) and (2,3) and the 'Shorten Path' procedure terminates. Once the shortest path has been created, the 'Move From (I,J) To (M,N)' procedure is executed to move the cleaning apparatus from (I,J) to (M,N).

Figure 4E:
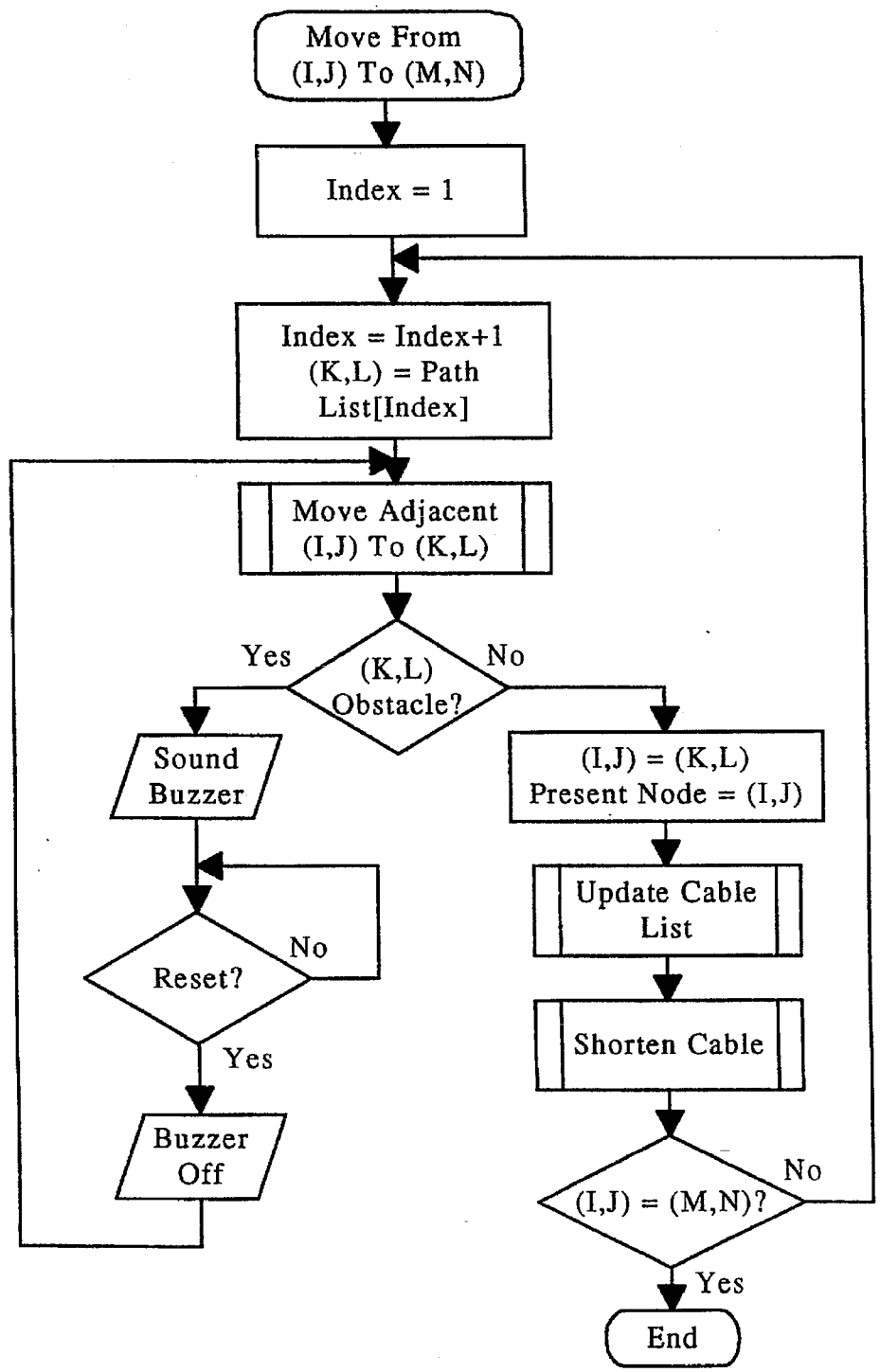

The flowchart for the 'Move From (I,J) To (M,N)' procedure is shown in FIG. 4e. Cleaning apparatus 1 moves sequentially from node (I,J) in the 'Path List' to node (K,L) corresponding to the next element in the 'Path List' using the 'Move Adjacent (I,J) To (K,L)' procedure until the cleaning apparatus 1 reaches the destination node (M,N). For the 'Path List' shown above, cleaning apparatus 1 moves from (4,2) to (3,2), (2,2) and finally to destination node (2,3). Each time the 'Move Adjacent (I,J) To (K,L)' procedure is executed, the procedures 'Update Cable List' and 'Shorten Cable' are executed. The 'Update Cable List' procedure updates the 'Cable List' while the 'Shorten Cable' procedure ensures that electrical power cable 27 does not loop around obstacles in the region being cleaned. Cleaning apparatus 1 is not expected to encounter obstacles during the move from node (I,J) to node (K,L) since all the nodes in the 'Path List' are members of the 'Cleaned List' and are therefore free of obstacles. However, if an obstacle is inadvertently placed on a node after it has been cleaned, but before the cleaning operation is complete, cleaning apparatus 1 will encounter this new obstacle. In this case, microcontroller system 36 will sound buzzer 37 to alert the operator to this situation, so that the obstacle may be removed. The cleaning operation will continue after the operator has removed the obstacle and pressed the reset button on cleaning apparatus 1.

Figure 4F:
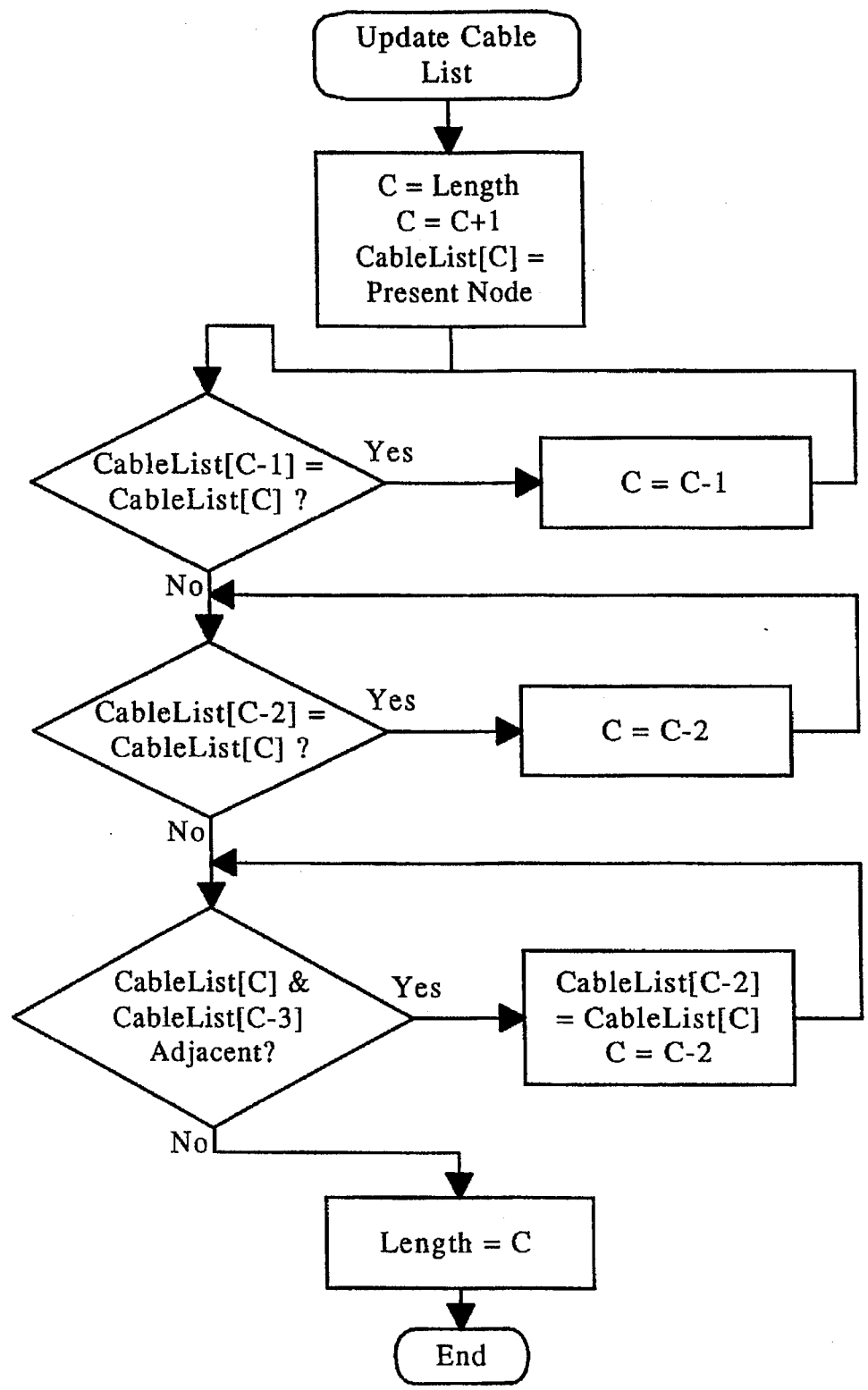

The flowchart for the 'Update Cable List' procedure is shown in FIG. 4f. The 'Cable List' is similar to the 'Path List' in structure and organization. Each element in the 'Cable List' represents a node that electrical power cable 27 crosses. The first element in the 'Cable List' is the starting or home position of the cleaning apparatus 1, and the last element in the 'Cable List' generally is the 'Present Node' (i.e. present position) of the cleaning apparatus 1. The number of elements in the 'Cable List' is referred to as the length of electrical power cable 27. The 'Update Cable List' procedure adds the 'Present Node' to the 'Cable List' and increments the length of the 'Cable List' by unity. The end of the 'Cable List' is then scanned to detect kinks in the 'Cable List'. Three types of kinks are detected. If the last element in the 'Cable List' is the same as the first element from the end in the 'Cable List', the last element is deleted from the 'Cable List' and the length of the 'Cable List' is decremented by unity. If the last element in the 'Cable List' is the same as the second element from the end in the 'Cable List', the last two elements are deleted from the 'Cable List' and the length of the 'Cable List' is decremented by two. If the last element in the 'Cable List' is adjacent to the third element from the end in the 'Cable List', the first and second elements from the end are deleted from the 'Cable List' and the length of the 'Cable List' is decremented by two.

Figure 4G:
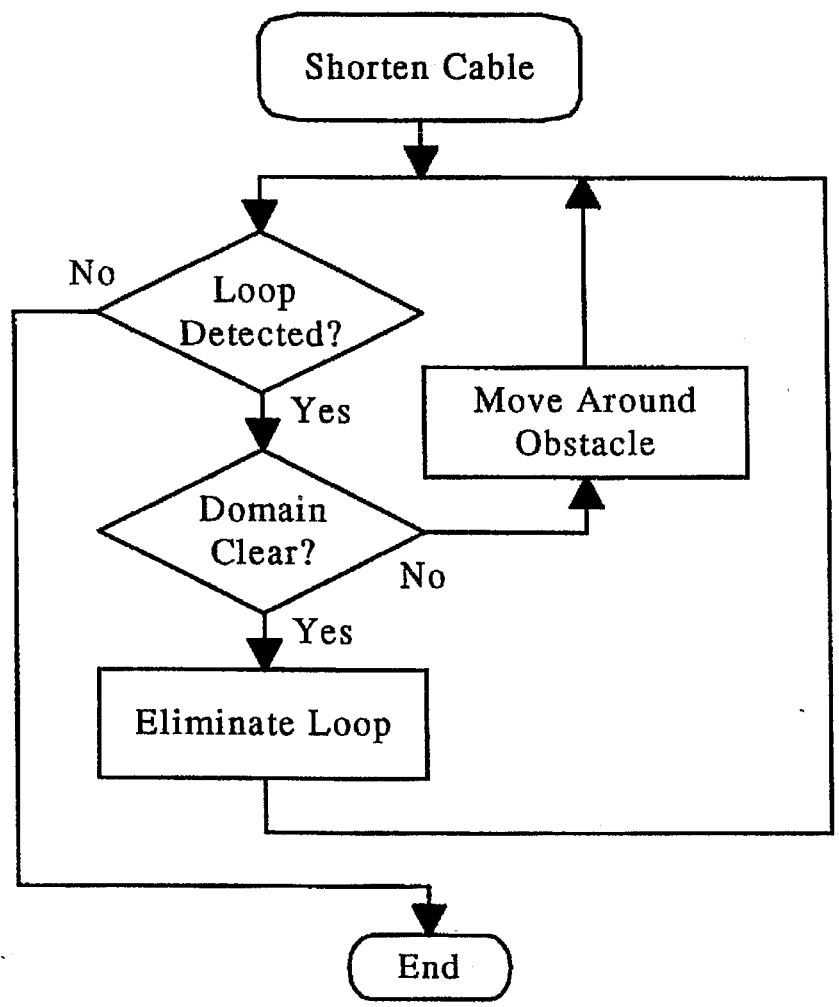

FIG. 4g shows the 'Shorten Cable' procedure. The 'Shorten Cable' procedure detects if electrical power cable 27 has loops or is looped around obstacles. If a loop is detected, the type of loop is determined. If electrical power cable 27 has looped around itself the 'Cable List' is revised to eliminate the loop by executing the 'Eliminate Loop' procedure. If electrical power cable 27 has looped around one or more obstacles, cleaning apparatus 1 travels around the obstacles by executing the 'Move Around Obstacle' procedure and returns to its original position to eliminate the loop. It is important to note that the 'Cable List' is essentially an internal representation of the position of electrical power cable 27 maintained by microcontroller system 36 so as to enable the 'Shorten Cable' procedure. While the 'Cable List' is a list of nodes in sequence which electrical power cable 27 crosses, the actual electrical power cable 27 may not necessarily pass through these nodes.

Figure 9:
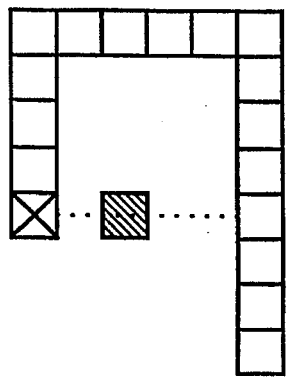
FIG. 9 illustrates the operation of the procedure used to ensure that the electrical power cable does not loop around obstacles in the area being cleaned.
Figure 9:
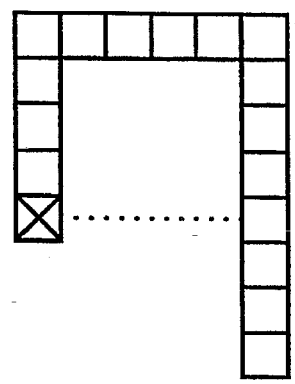
Figure 9:
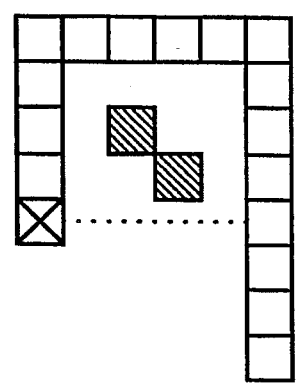
Figure 9:
Figure 9:
Figure 9:
Figure 9:
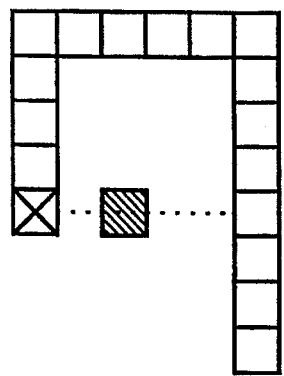
Figure 9:
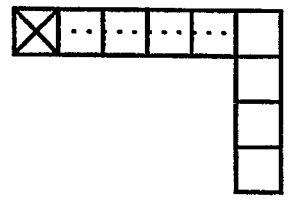
Figure 9:
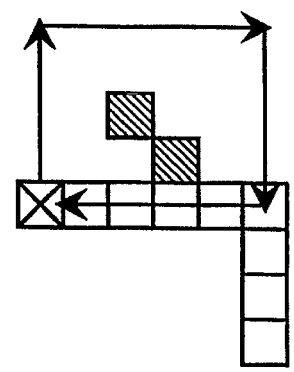

FIG. 9 illustrates the operation of the 'Shorten Cable' procedure which is used for loop detection. Electrical power cable 27 is indicated by a series of clear blocks, while nodes that are not in the 'Cleaned List' are indicated by shaded blocks. A perpendicular line to electrical power cable 27 drawn through the present position of cleaning apparatus 1 (denoted by a block with an X) is indicated by a dotted line in FIG. 9. Three cases, Case 1, Case 2 and Case 3 are shown. In Case 1, no loop is detected, since the perpendicular line passes through a shaded block. If a loop is detected, a signal is outputted indicating that a loop has been formed. If a loop is detected additional procedures are executed. In Case 2, the 'Eliminate Loop' procedure revises the 'Cable List' by dropping the nodes that are a part of the loop, while adding the nodes that lie along the perpendicular line. In Case 3, the domain contained within the loop is not clear; i.e. there are shaded blocks (i.e. nodes that are not in the 'Cleaned List') interior to the domain of the loop. If all the nodes that lie interior to the loop are in the 'Cleaned List' the domain contained within the loop is deemed to be clear. In this case, the 'Move Around Obstacle' procedure moves cleaning apparatus 1 around the shaded blocks and returns it to its original position to eliminate the loop. The path of travel is indicated by the arrows. The travel is accomplished by generating a path list around the obstacle and then executing the procedure 'Move From (I,J) To (M,N)' so that cleaning apparatus 1 moves along the path indicated by the arrows.

Figure 4H:
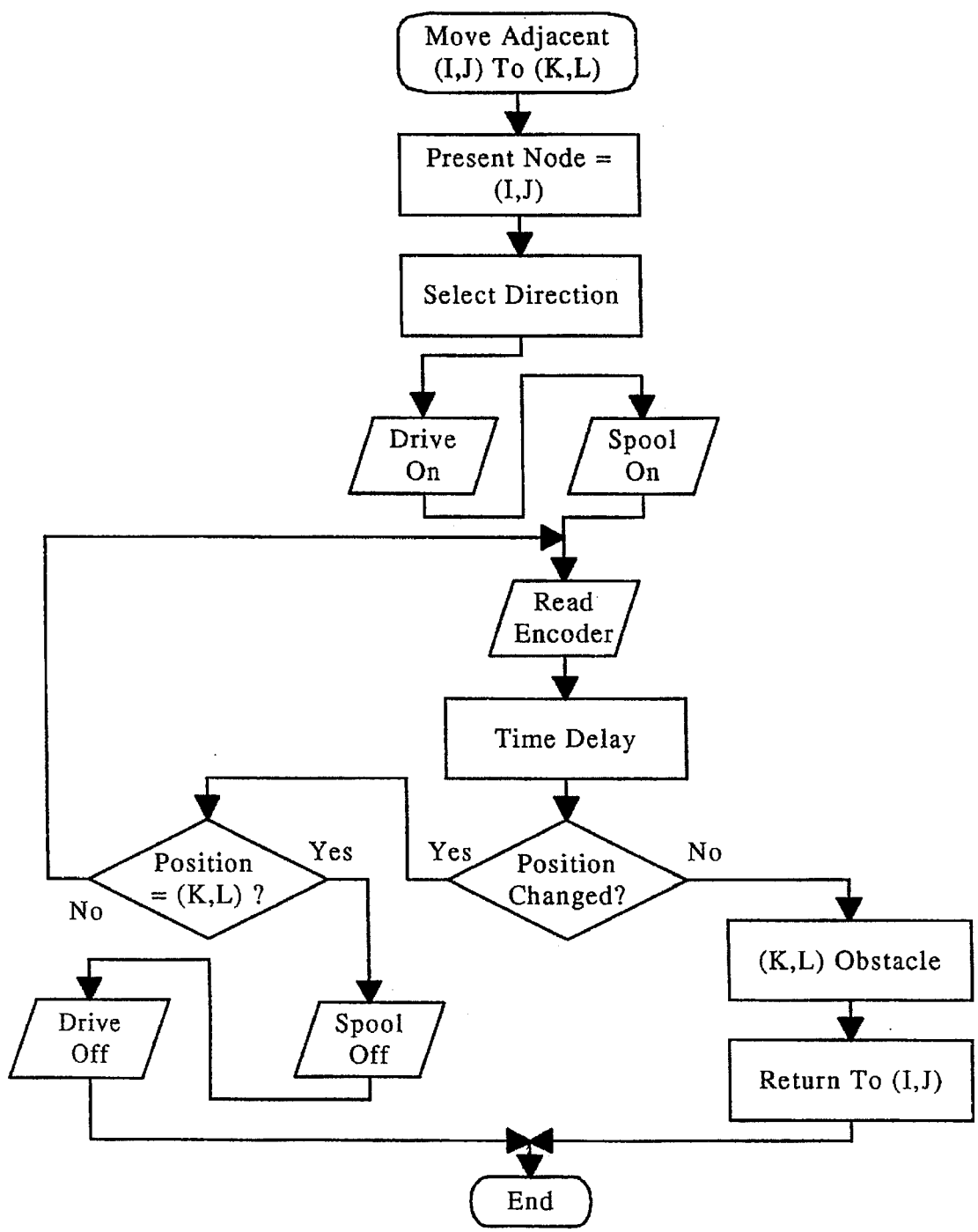

FIG. 4h shows the flowchart for the 'Move Adjacent (I,J) To (K,L)' procedure. The present position 'Present Node' (I,J) of cleaning apparatus 1 is compared with the desired position (K,L) to determine the direction of motion; i.e. right, front, left or back. Microcontroller system 36 then turns the drive on; i.e. outputs signals to control suction motor spindle 10 rotation direction, energize/deenergize appropriate retraction mechanisms 20, and engage/disengage clutches 24, so that selected driving wheels 17 start rotating and cleaning apparatus 1 moves along the desired direction, thereby cleaning surface 7. Microcontroller system 36 also turns the spool on; i.e. outputs signals to reversible spool motor 30 to take in or let out electrical power cable 27 so that there is no slack in electrical power cable 27. This ensures that electrical power cable 27 remains taut at all times. The position of cleaning apparatus 1 is checked periodically by monitoring the output of rotary encoders 19. If the position is not changing, this implies that cleaning apparatus 1 has encountered an obstacle. In this case, position (K,L) is recorded as being an obstacle in the 'Obstacle List', and cleaning apparatus 1 is returned to the previous position (I,J). Node (K,L) is marked as an obstacle and a signal is output indicating that an obstacle has been detected. In this manner obstacles in the path of cleaning apparatus 1 are detected. Obstacles that do not hinder the motion of cleaning apparatus 1 are ignored. If however, the position is changing, cleaning apparatus 1 continues its motion until the destination node (K,L) is reached. After the destination node (K,L) has been reached the spool and drive are turned off; i.e. reversible spool motor 30 stops rotating and clutch 24 is disengaged. In this manner, cleaning apparatus 1 moves from a position (I,J) to an adjacent position (K,L). If the 'Obstacle List' is not maintained, the operations associated with the 'Obstacle List' can be dropped from the flowchart without any loss of generality. The return to node (I,J) in case node (K,L) is blocked is accomplished by reversing suction motor spindle 10 and reversible spool motor 30. The position of cleaning apparatus 1 is periodically monitored until rotary encoders 19 indicates that node (I,J) has been reached. After node (I,J) has been reached the spool and drive are turned off.

Figure 4I:
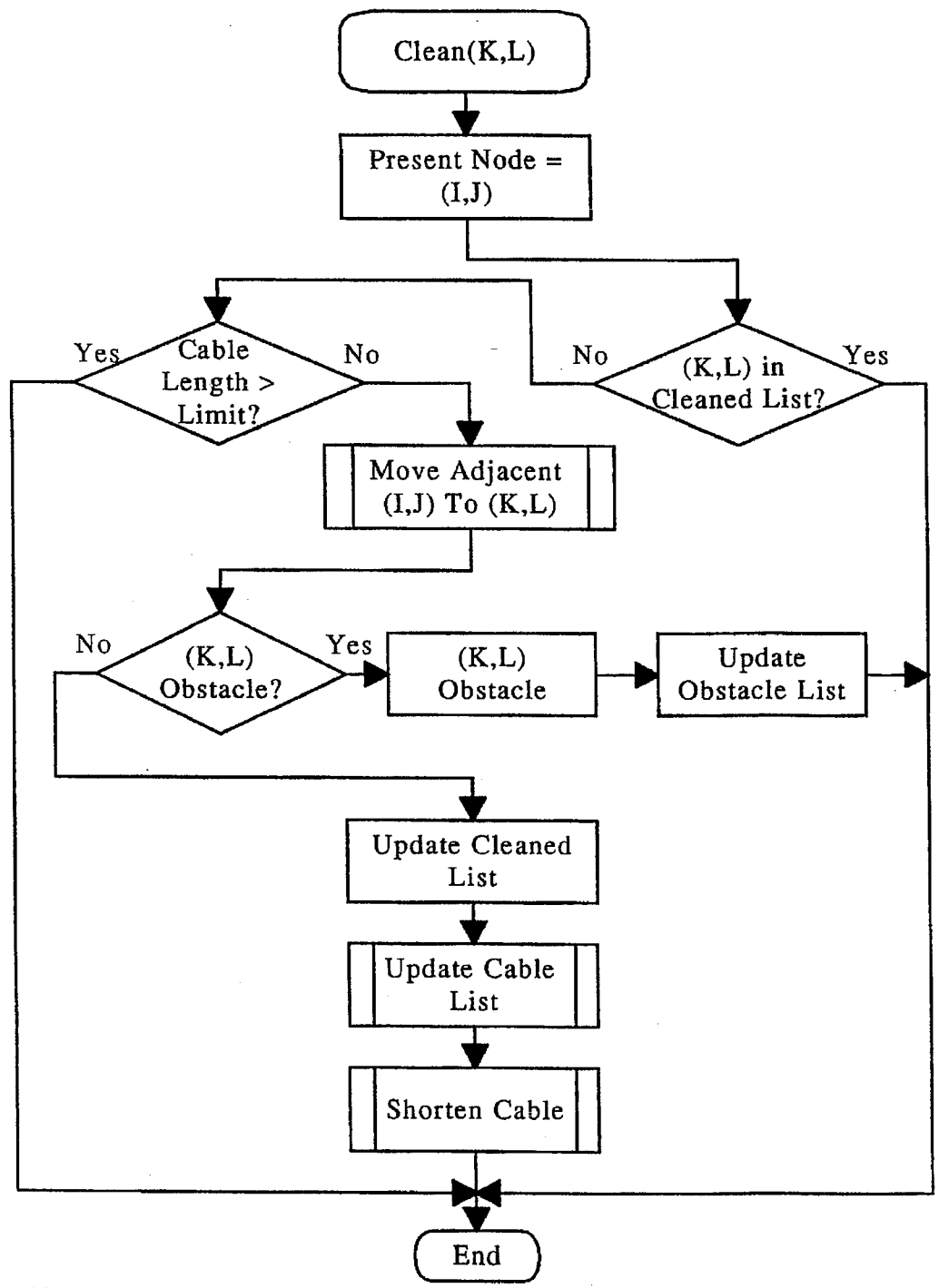

FIG. 4i shows the flowchart for the 'Clean(K,L)' procedure. The first step in the 'Clean(K,L)' procedure is to check if node (K,L) is in the 'Cleaned List' or if the length of electrical power cable 27 unwound from spool 26 exceeds a pre-defined limit. If both these conditions are false the 'Move Adjacent (I,J) To (K,L)' procedure is executed. If procedure 'Move Adjacent (I,J) To (K,L)' is successfully executed (i.e. cleaning apparatus 1 does not encounter an obstacle during the move to node (K,L)), the 'Update Cleaned List' procedure adds node (K,L) to the 'Cleaned List' and records node (I,J) as the ancestor of node (K,L). Then the 'Update Cable List' and 'Shorten Cable' procedures are executed in succession to ensure that the 'Cable List' does not have any kinks and electrical power cable 27 has not looped around obstacles. If the move to node (K,L) is not successful, node (K,L) is added to the 'Obstacle List'. By checking that the length of electrical power cable 27 unwound from spool 26 is not exceeded, cleaning apparatus 1 avoids stretching electrical power cable 27 beyond its physical length. If the 'Obstacle List' is not maintained, the operations associated with the 'Obstacle List' can be dropped from the flowchart without any loss of generality.

Figure 4J:
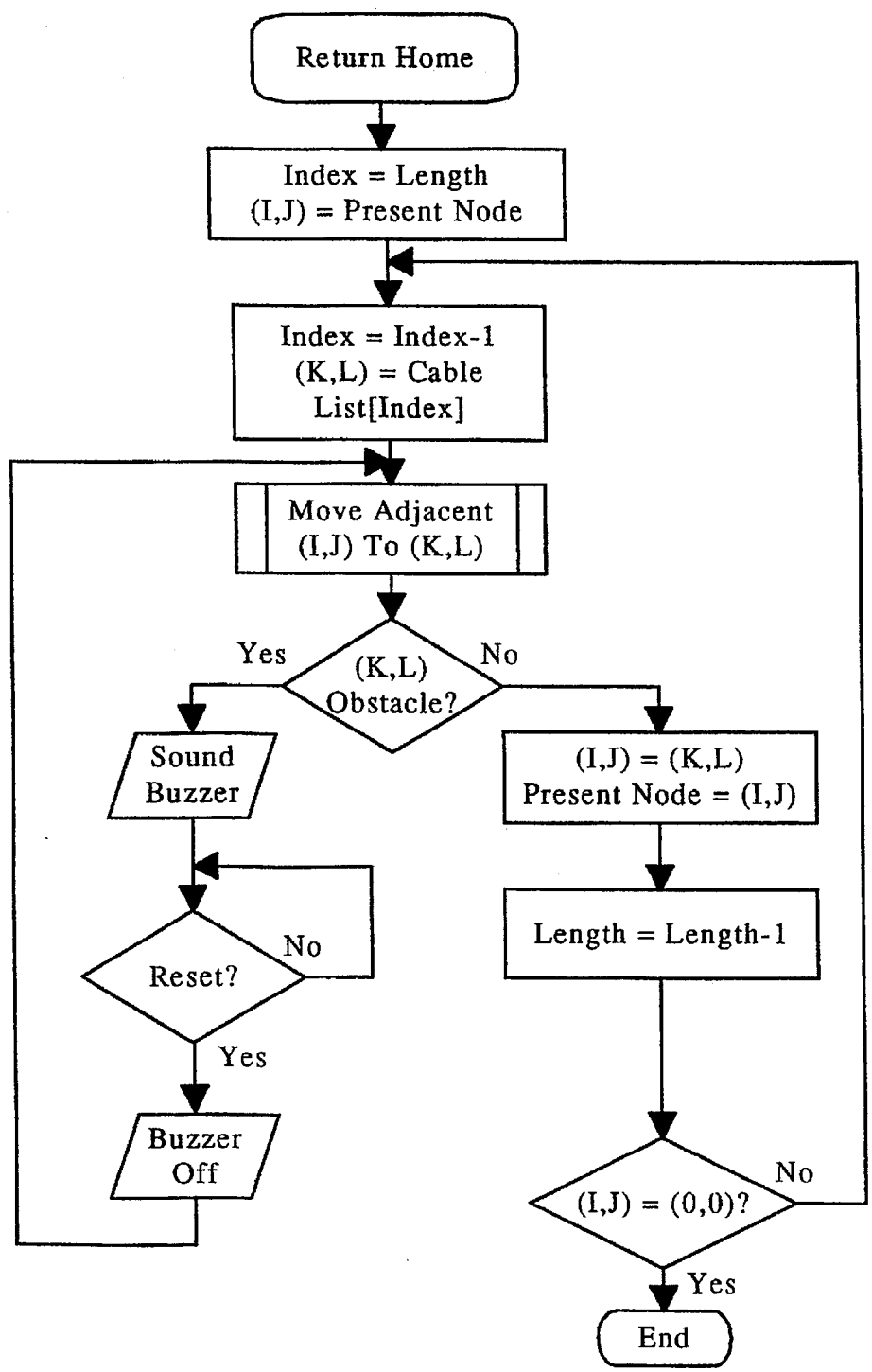

The flowchart for the 'Return Home' procedure is shown in FIG. 4j. Cleaning apparatus 1 moves sequentially from node (I,J) in the 'Cable List' to prior node (K,L) in the 'Cable List' using the 'Move Adjacent (I,J) To (K,L)' procedure until the cleaning apparatus 1 reaches the home position (0,0). Cleaning apparatus 1 is not expected to encounter obstacles during the move from node (I,J) to node (K,L) since all the nodes in the 'Cable List' are members of the 'Cleaned List' and are therefore free of obstacles. However, if an obstacle is inadvertently placed on a node after it has been cleaned, but before the cleaning operation is complete, cleaning apparatus 1 will encounter this new obstacle. In this case, microcontroller system 36 will sound buzzer 37 to alert the operator to this situation, so that the obstacle may be removed. The cleaning operation will continue after the operator has removed the obstacle and pressed the reset button on cleaning apparatus 1.

Figure 10A:
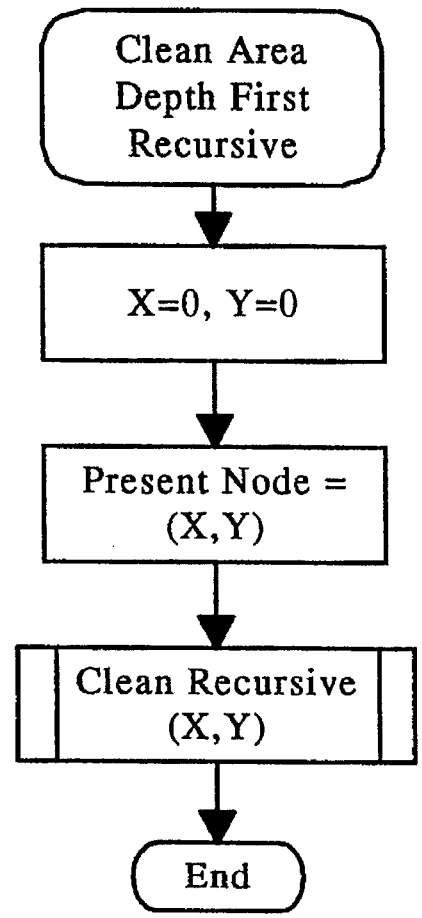
FIGS. 10a–10b are flowcharts of alternative embodiments of the control operation of the cleaning apparatus.

FIG. 10a shows the flowchart for an alternative embodiment of the 'Clean Area Depth First' operation. This embodiment is particularly suitable for microcontroller systems 36 that support recursive procedures. It is similar to the flowchart of FIG. 4b, except that the four variables 'Right', 'Left', 'Front' and 'Back' which are associated with each of the nodes in the 'Cleaned List' are not required. As before, the classical depth-first search is used to construct the path of motion of cleaning apparatus 1. The procedure 'Clean Area Depth First Recursive' begins by setting (X,Y) to (0,0) since the starting or home position is identical to the origin of the nodal coordinate system. The 'Clean Recursive(X,Y)' procedure is invoked just once to clean the entire area.

Figure 10B:
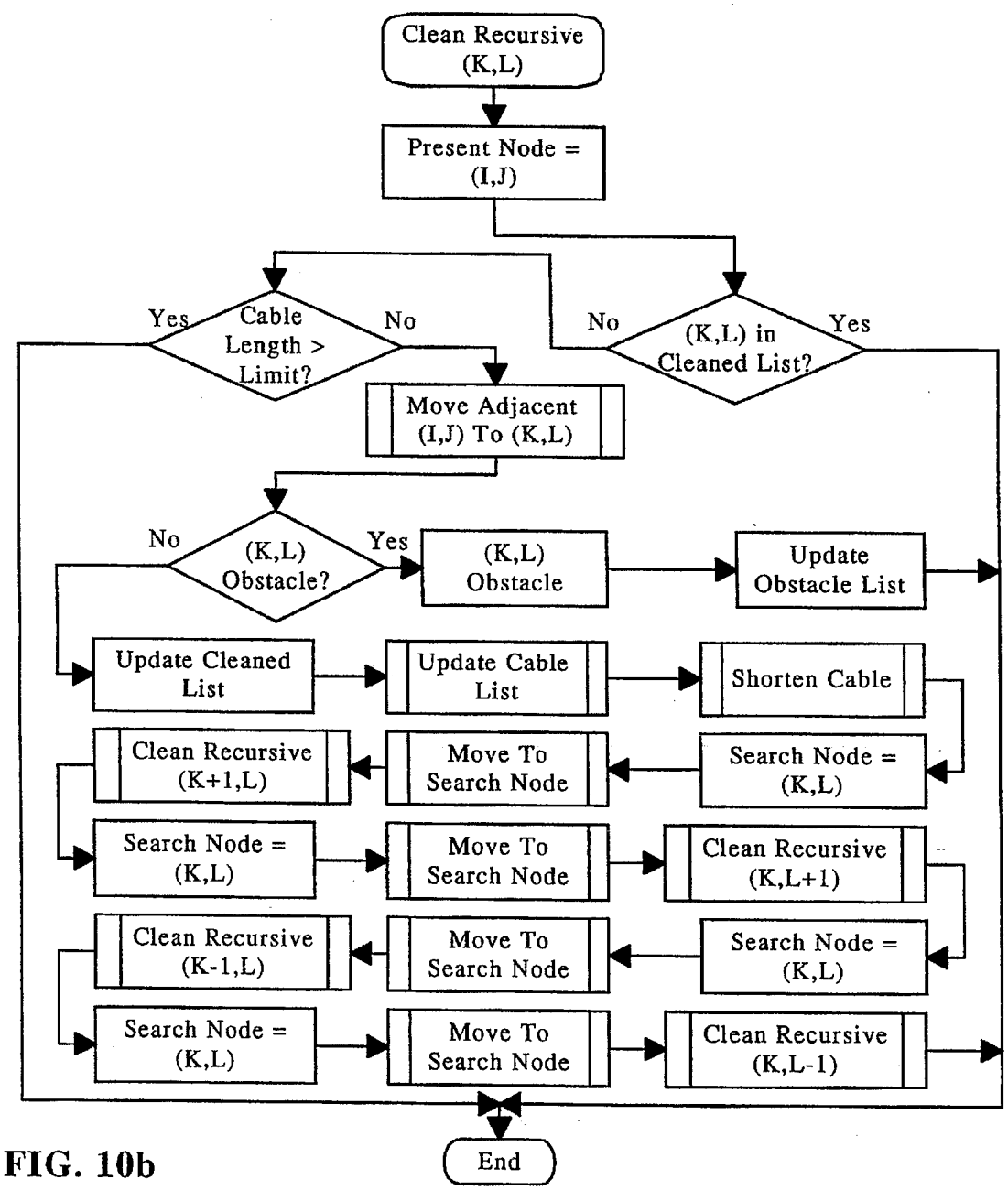

The flowchart of the recursive procedure 'Clean Recursive(K,L)' is shown in the FIG. 10b. Any procedure that invokes itself is termed recursive. The first step in the 'Clean Recursive(K,L)' procedure is to check if (K,L) is in the 'Cleaned List' or if the length of electrical power cable 27 unwound from spool 26 exceeds a pre-defined limit. If both these conditions are false the 'Move Adjacent (I,J) To (K,L)' procedure is executed. If procedure 'Move Adjacent (I,J) To (K,L)' is successfully executed (i.e. cleaning apparatus 1 does not encounter an obstacle during the move to node (K,L)), node (K,L) is added to the 'Cleaned List'. Then the 'Update Cable List' and 'Shorten Cable' procedures are executed in succession to ensure that the 'Cable List' does not have any kinks and electrical power cable 27 has not looped around obstacles. Next the 'Clean Recursive(K+1, L)', 'Clean Recursive(K,L+1)', 'Clean Recursive(K−1,L)', and 'Clean Recursive(K,L−1)' procedures are executed. These are the recursive calls to the 'Clean Recursive(K,L)' procedure. If the move to node (K,L) is not successful, node (K,L) is added to the 'Obstacle List'. By checking that the length of electrical power cable 27 unwound from spool 26 is not exceeded, cleaning apparatus 1 avoids stretching electrical power cable 27 beyond its physical length. If the 'Obstacle List' is not maintained, the operations associated with the 'Obstacle List' can be dropped from the flowchart without any loss of generality.

Figure 11A:
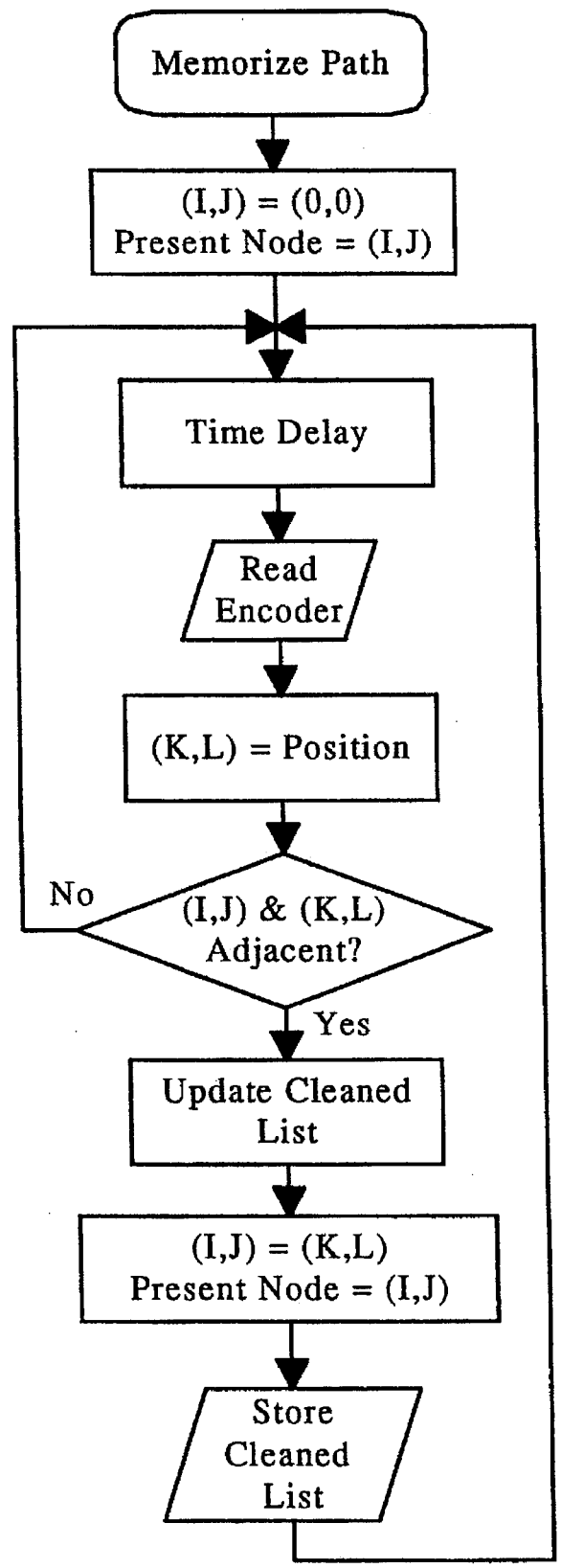
FIGS. 11a–11b are flowcharts of control operation of the cleaning apparatus in a learning mode and in a programmed mode.

FIG. 11a shows the flowchart of the 'Memorize Path' operation. While the operator manually moves cleaning apparatus 1 over the path to be cleaned, microcontroller system 36 periodically monitors the output of rotary encoders 19 to detect when a node (K,L) that is adjacent to the 'Present Node' (I,J) has been reached. When this condition is detected, the 'Update Cleaned List' procedure adds node (K,L) to the 'Cleaned List' and records node (I,J) as the ancestor of node (K,L). Also the 'Present Node' is set to node (K,L). The 'Cleaned List' is then stored in the non-volatile random access memory of microcontroller system 36. Procedure 'Memorize Path' terminates after the operator has covered the entire path to be memorized and has turned off the electrical power to cleaning apparatus 1.

Figure 11B:
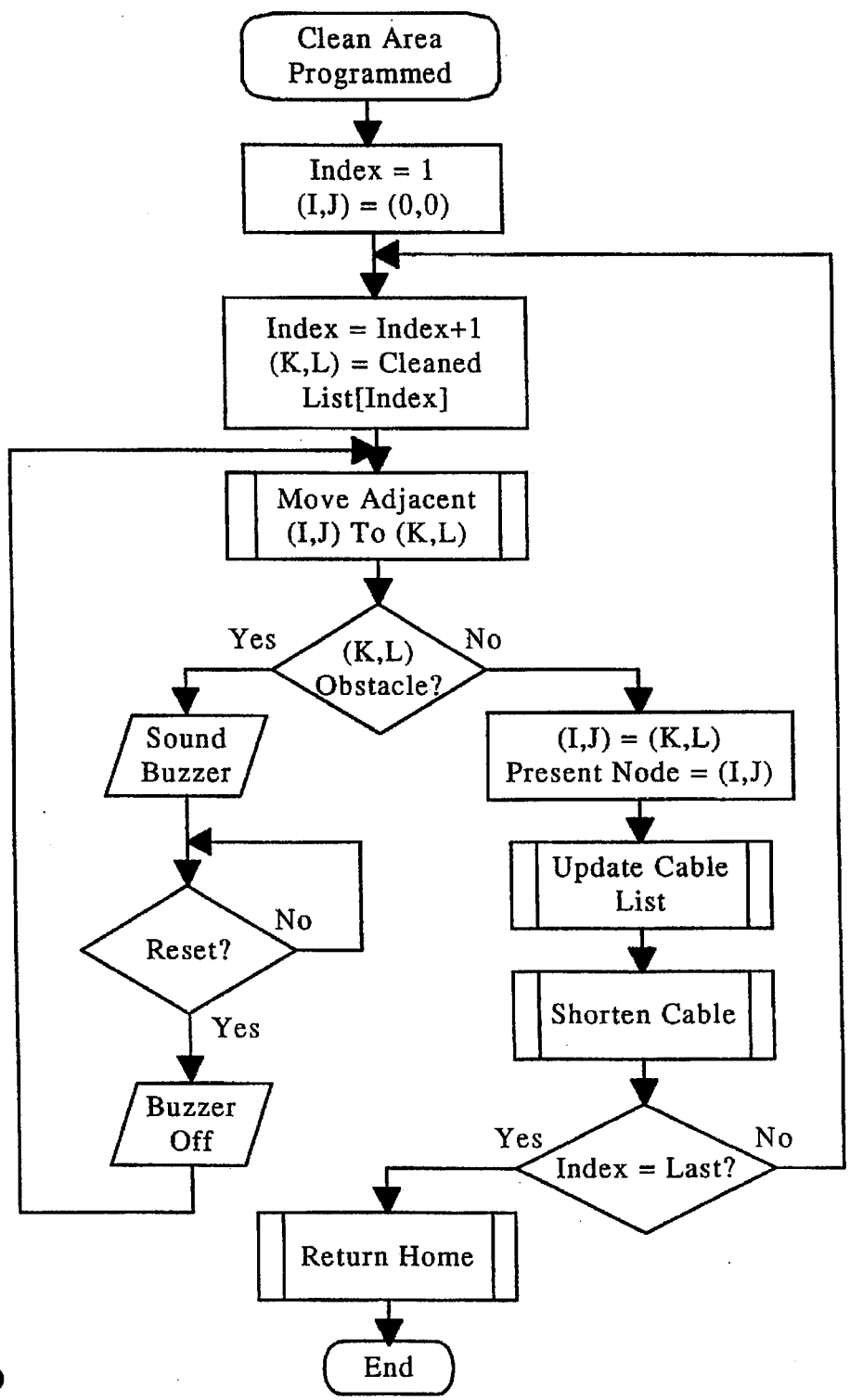

The flowchart of the 'Clean Area Programmed' is shown in FIG. 11b. The operator first moves cleaning apparatus 1 to the home position prior to switching on electrical power. Cleaning apparatus 1 moves sequentially from node (I,J) in the 'Cleaned List' to node (K,L) corresponding to the next element in the 'Cleaned List' using the 'Move Adjacent (I,J) To (K,L)' procedure until the node corresponding to the last element in the 'Cleaned List' has been reached. Microcontroller system 36 retrieves the 'Cleaned List' from its non-volatile random access memory. Each time the 'Move Adjacent (I,J) To (K,L)' procedure is executed, the procedures 'Update Cable List' and 'Shorten Cable' are executed. The 'Update Cable List' procedure updates the 'Cable List' while the 'Shorten Cable' procedure ensures that electrical power cable 27 does not loop around obstacles in the region being cleaned. Cleaning apparatus 1 is not expected to encounter obstacles during the move from node (I,J) to node (K,L) since all the nodes are members of the 'Cleaned List' and are therefore free of obstacles. However, if an obstacle is inadvertently placed on a node after it has been cleaned, but before the cleaning operation is complete, cleaning apparatus 1 will encounter this new obstacle. In this case, microcontroller system 36 will sound buzzer 37 to alert the operator to this situation, so that the obstacle may be removed. The cleaning operation will continue after the operator has removed the obstacle and pressed the reset button on cleaning apparatus 1. After the node corresponding to the last element in the 'Cleaned List' has been reached, microcontroller system 36 executes procedure 'Return Home' to return cleaning apparatus 1 to its home position (0,0).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A self-guided, self-propelled, convertible cleaning apparatus which comprises:
   a cleaning unit comprising:
   (a) cleaning means for cleaning an area;
   (b) moving means for moving said cleaning unit in two mutually orthogonal directions over said area;
   (c) position detection means for detecting the position of said cleaning unit relative to a starting position and outputting position signals indicative thereof;
   (d) obstacle detection means for detecting obstacles located within said area that hinder the motion of said cleaning unit and outputting obstacle signals indicative thereof;
   (e) power cable means for powering said cleaning unit from an external power source;
   (f) fastening means for fastening said power cable to said external power source;
   (g) loop detection means for detecting when said power cable has looped around said obstacles and outputting loop signals indicative thereof; and
   (h) control means for controlling said moving means in conjunction with said obstacle signals, said position signals, and said loop signals to enable said cleaning unit to automatically traverse said area, evade said obstacles, and prevent looping of said power cable around said obstacles; and
   tensioning means for removing slack from said power cable to ensure that said power cable is taut at all times.

2. A self-guided, self-propelled, convertible cleaning apparatus in accordance with claim 1 said cleaning means comprising:
   (a) a plurality of suction nozzles;
   (b) a suction hose which is detachable from said cleaning apparatus;
   (c) brushes disposed within said suction nozzles;
   (c) suction means for picking up dust and debris; and
   (d) means for collecting said dust.

3. A self-guided, self-propelled, convertible cleaning apparatus in accordance with claim 1 said moving means comprising:
   (a) a plurality of wheels; and
   (b) means for rotating a selected subset of said wheels to move said cleaning apparatus in said mutually orthogonal directions over said area.

4. A self-guided, self-propelled, convertible cleaning apparatus in accordance with claim 1 said position detection means comprising position sensors attached to said wheels.

5. A self-guided, self-propelled, convertible cleaning apparatus in accordance with claim 1 said obstacle detection means comprising the method of:
   (a) periodically monitoring position of said cleaning unit using said position detection means; and
   (b) outputting said obstacle signals when motion of said cleaning unit is impeded by said obstacles and said position signals are not changing with time.

6. A self-guided, self-propelled, convertible cleaning apparatus in accordance with claim 1 said fastening means comprising:
   (a) an electrical plug with two power pins and a ground pin; and
   (b) means for enlarging diameter of said ground pin to fasten said electrical plug to said external power source.

7. A self-guided, self-propelled, convertible cleaning apparatus in accordance with claim 1 said tensioning means comprising:
   (a) winding means for winding said power cable; and
   (b) said winding means installed within said cleaning unit.

8. A self-guided, self-propelled, convertible cleaning apparatus in accordance with claim 1 said tensioning means comprising:
   (a) winding means for winding said power cable; and
   (b) said winding means disposed separate from said cleaning unit.

9. A self-guided, self-propelled, convertible cleaning apparatus in accordance with claim 1 said control means comprising:
   (a) a microcontroller system comprising a microprocessor, random access non-volatile memory, random access memory, input ports and output ports; and
   (b) instructions embedded in said microcontroller system that direct operation of said microcontroller system.

10. A self-guided, self-propelled, convertible cleaning apparatus in accordance with claim 9 said instructions comprising:
    (a) means for subdividing said area into nodes by gridlines;
    (b) means for representing said nodes as a search tree; and
    (c) means for using a tree search to automatically traverse said nodes while evading said obstacles within said area and avoiding looping of said power cable around said obstacles.

11. A self-guided, self-propelled, convertible cleaning apparatus in accordance with claim 9 said instructions comprising:
    (a) means for subdividing said area into nodes by gridlines;
    (b) means for representing said nodes as a search tree; and
    (c) means for using a depth-first tree search to automatically traverse said nodes while evading said obstacles within said area and avoiding looping of said power cable around said obstacles.

12. A self-guided, self-propelled, convertible cleaning apparatus in accordance with claim 9 said instructions comprising:
    (a) means for subdividing said area into nodes by gridlines;
    (b) means for representing said nodes as a search tree; and
    (c) means for using a breadth-first tree search to automatically traverse said nodes while evading said obstacles within said area and avoiding looping of said power cable around said obstacles.

13. A self-guided, self-propelled, convertible cleaning apparatus in accordance with claim 9 said instructions comprising:
    (a) means for subdividing said area into nodes by gridlines; and
    (b) means for enabling said control means for manual operation by an operator.

14. A self-guided, self-propelled, convertible cleaning apparatus in accordance with claim 9 said instructions comprising:

(a) means for subdividing said area into nodes by gridlines;

(b) means for enabling said control means for manual operation by an operator;

(c) means for storing said nodes traversed by said cleaning apparatus during said manual operation as a list in said non-volatile random access memory; and (d) means for using said list during a subsequent cleaning session to automatically traverse said nodes while evading said obstacles within said area, avoiding looping of said power cable around said obstacles, and returning to said starting position.

15. A self-guided, self-propelled, convertible cleaning apparatus in accordance with claim 1 said loop detection means comprising:

(a) means for storing position of said power cable in said random access memory;

(b) means for examining said stored positions to check if a loop has been formed; and (c) means for outputting loop signals if said loop has been formed.

16. A self-guided, self-propelled, convertible cleaning apparatus which comprises:

(a) cleaning means for cleaning an area;

(b) moving means for moving said cleaning apparatus in two mutually orthogonal directions over said area;

(c) position detection means for detecting the position of said cleaning apparatus relative to a starting position and outputting position signals indicative thereof;

(d) obstacle detection means for detecting obstacles located within said area that hinder the motion of said cleaning apparatus and outputting obstacle signals indicative thereof;

(e) internal power source means for powering said cleaning apparatus; and (f) controlling means for controlling said moving means in conjunction with said obstacle signals, said position signals, and performance of a tree search of said area represented as a series of nodes, said control means enabling said cleaning apparatus to automatically traverse said area, and evade said obstacles within said area.

* * * * *